United States Patent
Nakamura et al.

(10) Patent No.: US 8,402,212 B2
(45) Date of Patent: Mar. 19, 2013

(54) STORAGE SYSTEM AND MANAGEMENT METHOD OF ITS STORAGE MEDIUM

(75) Inventors: Shuji Nakamura, Machida (JP); Makio Mizuno, Sagamihara (JP); Katsuya Tanaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1126 days.

(21) Appl. No.: 12/105,093

(22) Filed: Apr. 17, 2008

(65) Prior Publication Data

US 2009/0222623 A1      Sep. 3, 2009

(30) Foreign Application Priority Data

Feb. 29, 2008   (JP) .................................. 2008-050666

(51) Int. Cl.
*G06F 13/00* (2006.01)
(52) U.S. Cl. ........ 711/114; 714/4.2; 714/6.11; 714/6.22
(58) Field of Classification Search .................. 711/114; 714/4.2, 6.2–6.22, 47.1–47.3, 48–57
See application file for complete search history.

(56) References Cited

U.S. PATENT DOCUMENTS

| | | | |
|---|---|---|---|
| 6,219,753 B1 * | 4/2001 | Richardson | 711/114 |
| 6,757,782 B2 * | 6/2004 | Higaki et al. | 711/114 |
| 2005/0182898 A1 * | 8/2005 | Davis et al. | 711/114 |
| 2006/0048018 A1 * | 3/2006 | Hosoya et al. | 714/48 |
| 2007/0240014 A1 * | 10/2007 | Nagata et al. | 714/8 |
| 2008/0005470 A1 | 1/2008 | Davies | |

FOREIGN PATENT DOCUMENTS

JP       2001-222385         8/2001

* cited by examiner

*Primary Examiner* — Jared Rutz
*Assistant Examiner* — Nicholas Simonetti
(74) *Attorney, Agent, or Firm* — Brundidge & Stanger, P.C.

(57) ABSTRACT

High availability is provided in a storage system that offers expandability more inexpensively. Provided is a storage system including multiple expanders to be connected to multiple storage mediums, multiple cascades connected respectively to a prescribed number of expanders among the multiple expanders, and multiple control units for respectively controlling the multiple cascades. One end of the multiple cascades is connected with an inter-cascade link, and the inter-cascade link has a logically connected state and a logically disconnected state.

13 Claims, 25 Drawing Sheets

FIG.3

| LDEV | LBA | HDD# | REDUNDANCY SCHEME |
|---|---|---|---|
| 0 | 0x00000000~0x1fffffff | 0 | RAID1 |
| | | m/2+1 | |
| 23 | 0x00000000~0x5fffffff | 2 | RAID5 |
| | | m/4+2 | |
| | | 2m/4+2 | |
| | | 3m/4+2 | |
| 211 | 0x00000000~0x9fffffff | 3 | RAID10 |
| | | 4 | |
| | | m/2+3 | |
| | | m/2+4 | |
| - | UNALLOCATED | 10 | - |
| | | ... | |
| | | n | |

410  420  430  440  400

| DISTANCE | EXPANDER | HDD# | RESTORATION TARGET |
|---|---|---|---|
| 1 | exp0 | HDD0 | 0 |
| | | HDD1 | 0 |
| | | HDD2 | 0 |
| | | HDD3 | 0 |
| | | ... | ... |
| 2 | exp1 | HDD4 | 0 |
| | | HDD5 | 0 |
| | | HDD6 | 0 |
| | | HDD7 | 0 |
| | | ... | ... |
| 3 | exp2 | HDD8 | 0 |
| | | HDD9 | 0 |
| | | HDD10 | 1 |
| | | HDD11 | 0 |
| | | ... | ... |
| 4 | exp3 | HDD12 | 0 |
| | | HDD13 | 0 |
| | | HDD14 | 0 |
| | | HDD15 | 0 |
| | | ... | ... |
| | ... | | |

US 8,402,212 B2

STORAGE SYSTEM AND MANAGEMENT METHOD OF ITS STORAGE MEDIUM

CROSS-REFERENCES

This application relates to and claims priority from Japanese Patent Application No. 2008-050666, filed on Feb. 29, 2008, the entire disclosure of which is incorporated herein by reference.

BACKGROUND

The present invention generally relates to a storage system and a management method of its storage medium, and can be suitably applied to a storage system having a storage medium and an internal network for connecting such storage medium, and a management method of its storage medium.

With a storage system, storage mediums such as a plurality of hard disk drives (HDD) are connected to a storage controller to configure one large storage apparatus. By connecting a plurality of storage mediums, data can be made redundant in addition to being able to provide a large capacity, and availability can be improved thereby. RAID (Redundant Arrays of Inexpensive Disks) and the like are known as this kind of technology. In addition, as technology for providing a connection method of multiple storage mediums, there is SCSI as an interface that connects based on the bus system, or a fibre channel as an interface capable of forming a network on the topology of a fabric or a loop. In order to realize high availability of a storage system, not only is the redundancy of the storage medium to store data important, the redundancy of the network that connects the storage medium to the storage controller and enables access is also important. For example, Japanese Patent Laid-Open Publication No. 2001-222385 describes technology for improving the redundancy in a case of connecting hard disks with a fibre channel arbitrated loop configuration.

In addition, there is SAS (Serial Attached SCSI) as an interface for connecting multiple storage mediums. With SAS, a plurality of devices are connected with SAS expanders. Even a greater number of storage mediums can be connected by connecting the expanders in multiple tiers, and a large number of storage mediums can be connected inexpensively in comparison to conventional interfaces. Meanwhile, an expander is a semiconductor having a logical function, and is vulnerable to failure caused by malfunction or noise. In a configuration where multiple storage mediums are connected with expanders arranged in series, if a certain expander is subject to failure, the storage mediums connected beyond the defective expander with the storage controller as the origin will become inaccessible even if those storage mediums are normal (operable). The redundancy of data will thereby deteriorate considerably.

SUMMARY

If there is redundancy, even if a certain component fails, the operation can be continued by using the remaining normal components. During that time, the redundancy can be recovered by replacing the defective component. Nevertheless, if another failure occurs in a similar component before the lost redundancy is recovered, the operation of the storage system cannot be continued, and the data stored in the storage system may be lost depending on the type of defective component.

Meanwhile, if a failure occurs in the expander as described above, multiple hard disks will become inaccessible, and multiple components will lose its redundancy. In other words, the risk of data loss will increase. Thus, the task would be to inhibit the deterioration of redundancy and maintain availability even when a failure occurs in the expanders.

With conventional technology, the network is configured from a loop-shaped communication means such as a fibre channel arbitrated loop, and is not related to a SAS network. Access to a hard disk at a remote location from the failed location with the storage controller being the origin needed to be made using the other port of the hard disk.

The present invention was made in view of the foregoing points. Thus, an object of the present invention is to provide a storage system and a management method of its storage medium capable of providing high availability in a storage system that offers expandability inexpensively.

Specifically, the present invention provides a storage system comprising a plurality of expanders to be connected to a plurality of storage mediums, a plurality of cascades connected respectively to a prescribed number of expanders among the plurality of expanders, and a plurality of control units for respectively controlling the plurality of cascades. The storage system further comprises an inter-cascade link configured by connecting expanders at an end that is different from the side to be connected to the control units of the plurality of cascades. Each of the plurality of control units manages the inter-cascade link as a logically connected state or a logically disconnected state.

The present invention additionally provides a storage system comprising a plurality of expanders to be connected to a plurality of storage mediums, a plurality of cascades connected respectively to a prescribed number of expanders among the plurality of expanders, and a plurality of control units for respectively controlling the plurality of cascades. The storage system further comprises a plurality of selectors arranged between expanders at an end that is different from the side to be connected to the control units of the plurality of cascades. Each the plurality of control units manages the connection status using the selector in two modes.

According to the present invention, it is possible to provide a storage system and a management method of its storage medium capable of providing high availability in a storage system that offers expandability inexpensively. In addition, according to the present invention, it is possible to provide a highly available storage system and a management method of its storage medium using a SAS interface that can be connected to multiple storage mediums inexpensively.

DESCRIPTION OF DRAWINGS

FIG. 3 is a diagram showing an LDEV table retained in each CHA according to the same embodiment;

DETAILED DESCRIPTION

Figure 1:
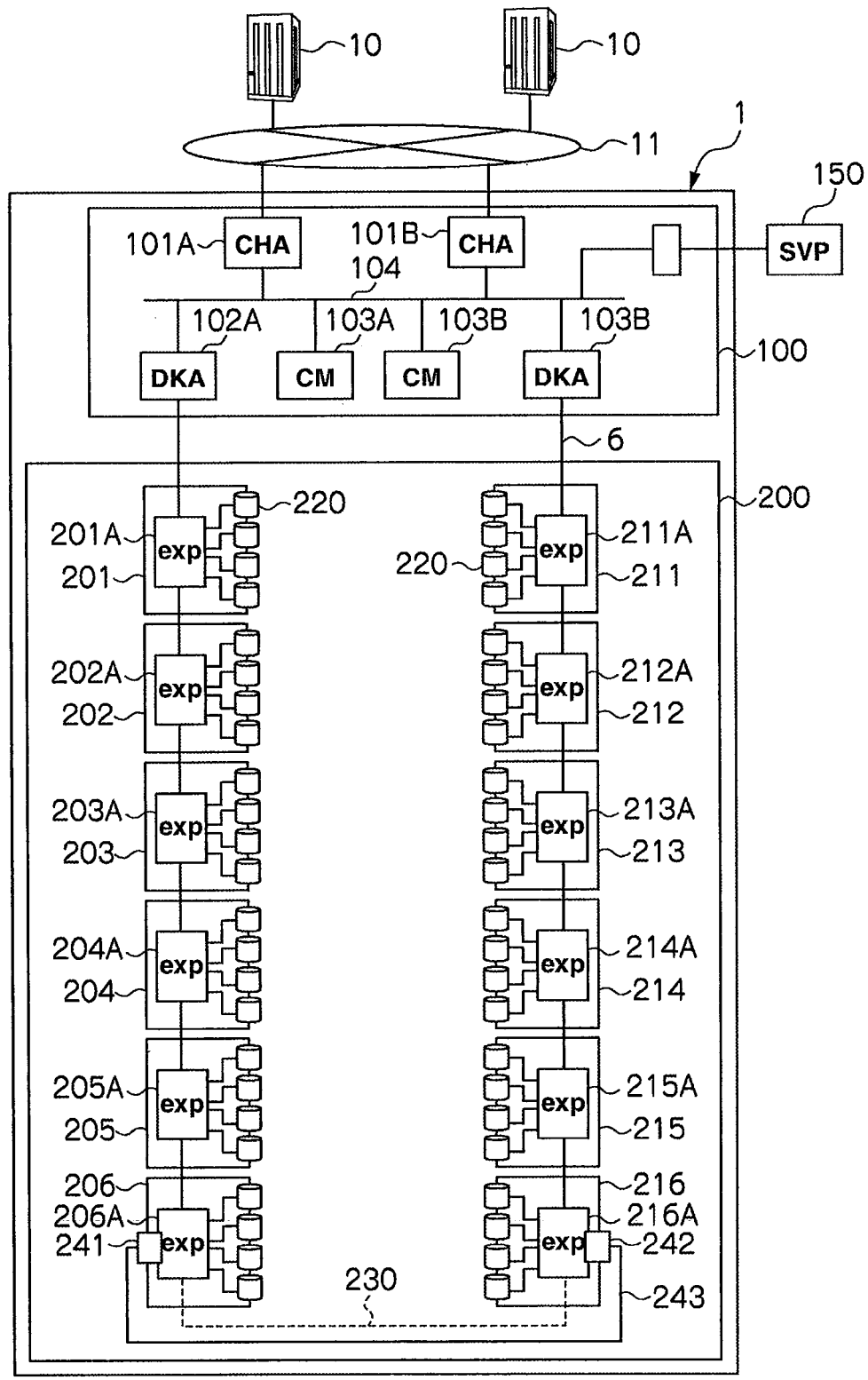
FIG. 1 is a block diagram of a storage system according to a first embodiment of the present invention.

Embodiments of the present invention are now explained with reference to the attached drawings. FIG. 1 is a block diagram of a storage system 1 according to the present invention.

The storage system 1 comprises a storage controller 100 and a disk unit 200. In addition, a plurality of host computers 10 are connected to the storage controller 100 via a SAN (Storage Area Network) 11.

The storage controller 100 includes channel adapters (CHA) 101A, 101B, disk adapters (DKA) 102A, 102B and cache memories (CM) 103A, 103B, and these components are mutually connected via an internal connection 104. In the ensuing explanation, the CHAs 101A and 101B are sometimes referred to as the CHA 101, the DKAs 102A and 102B are sometimes referred to as the DKA 102, and the CMs 103A and 103B are sometimes referred to as the CM 103.

The CHA 101 is connected to the host computer 10 via the SAN 11, and exchanges data with the host computer 10 such as the analysis of or response to the host request.

The DKA 102 is connected to a hard disk drive (HDD) 220 via expanders 201A to 206A, 211A to 216A through a disk-side channel 6, and stores data in the HDD 220 or reads data from the HDD 220 according to commands from the CHA 101 based on the host request analysis result or the like. Here, data is temporarily stored in the CM 103 having a storage element that is faster than the HDD 220, and data is exchanged between the CHA 101 and the DKA 102 via such CM 103.

The expanders 201A to 206A, 211A to 216A are connected to a plurality of HDDs 220 and other expanders or the DKA 102. Further, each expander 201A to 206A, 211A to 216A and a plurality of HDDs 220 connected thereto form units 201 to 206, 211 to 216. The DKA 102 designates the HDD 220 to be accessed with a number and sets up a connection, and thereby exchanges commands and data.

Among the expanders 201A to 206A, 211A to 216A that are respectively cascade-connected from the DKAs 102A, 102B, the innermost expanders 206A, 216A are connected with an inter-cascade link 230. Although the expanders 206A, 216A are physically connected with the inter-cascade link 230, since they are of a logically connected/disconnected state, the inter-cascade link 230 is shown with a dotted line in FIG. 1.

If no failure has occurred to any one of the expanders 201A to 206A, 211A to 216A, the inter-cascade link 230 is logically disconnected. Specifically, a valid bit of a port corresponding to a valid column of the forwarding table 310 in the respective expanders 201A to 206A, 211A to 216A described later is turned off. In addition, the configuration may also be such that a switch for simply turning on and turning off the connection is provided, and controlled with a signal line.

According to this configuration, the cascade of the expanders 201A to 206A and the cascade of the expanders 211A to 216A can be deemed to be two independent cascades, and the redundancy of the disk-side channel 6 is thereby secured.

Moreover, a validation command of the inter-cascade link 230 received by the expanders on one side can be transmitted to the expanders (for instance, expander 216A to expander 206A) connected to the inter-cascade link 230 on the other side with an inter-cascade link setup signal line 243 that is separate from a link that transmits data of the HDD 220, and the validation setting can also be reflected on the expanders on the other side. The setup signal line 243 is connected using a setup port 241 in the expander 206A and a setup port 242 in the expander 216A.

Moreover, the service processor (SVP) 150 that performs various settings is connected to the storage controller 100 via a LAN (Local Area Network), and connected to the respective components via the LAN interface.

Figure 2:
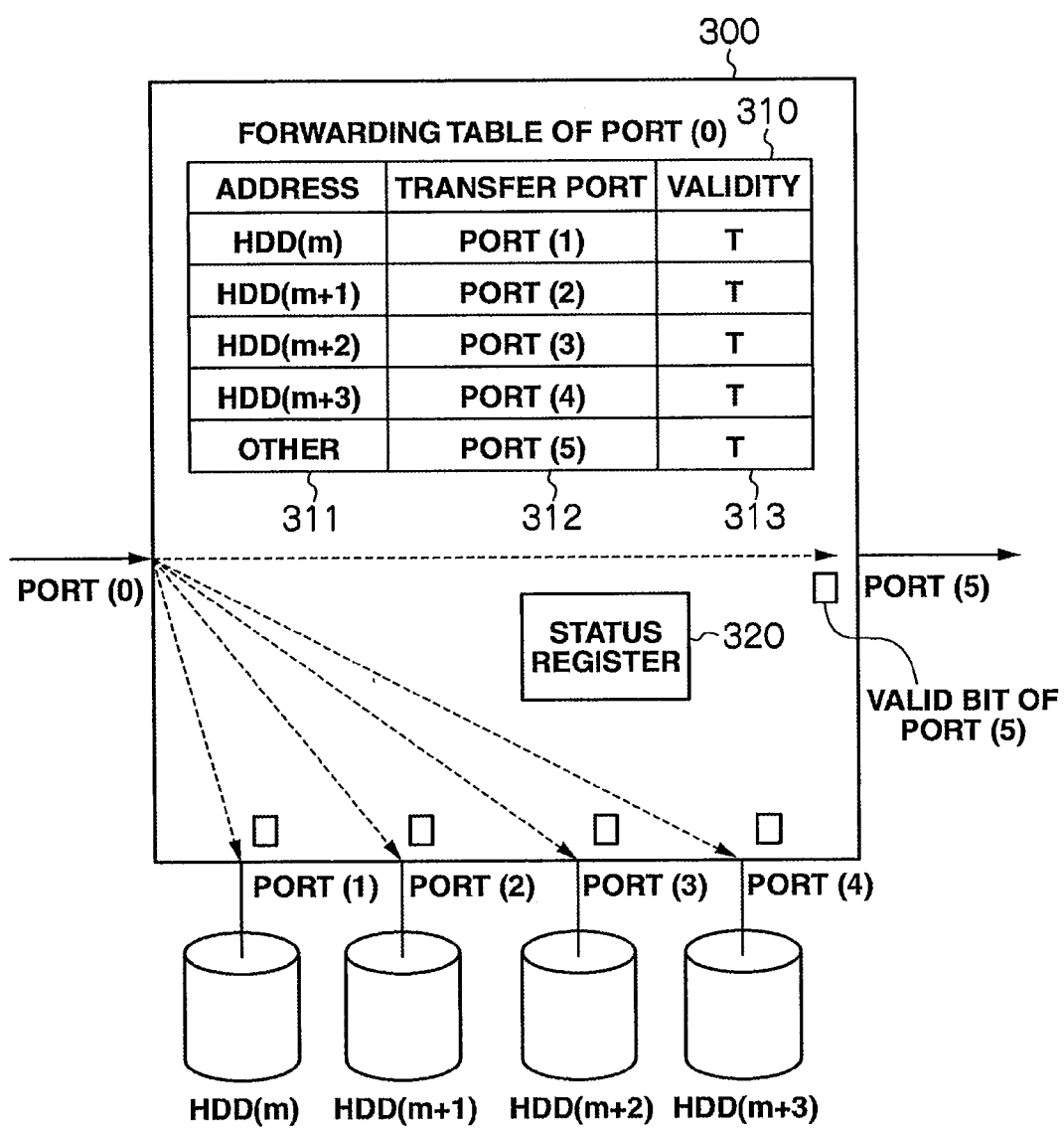
FIG. 2 is a block diagram representing the details of an expander according to the same embodiment.

FIG. 2 is a block diagram showing an expander 300 for explaining the details of the configuration that is common to the expanders 201A to 206A, 211A to 216A.

Here, let it be assumed that the expander 300 has a total of six ports; namely, port (0) to port (5). As an example, let it be assumed that the port (0) is connected to the DKA 102 side, and the port (5) is connected to the next cascade-connected expander, and the HDD (m) to the HDD (m+3) are respectively connected to the port (1) to the port (4).

The expander 300 has a forwarding table corresponding to the respective ports. FIG. 2 shows the details concerning the forwarding table 310 of the port (0). The forwarding table 310 shows to which port the connection establishment request received by that port should be transferred. For example, let it be assumed that the port (0) receives a connection establishment request to the HDD (m+2). Here, to which port the connection establishment request should be transferred is determined by referring to the forwarding table 310.

The forwarding table 310 includes an address column 311, a transfer port column 312, and a valid column 313. The expander 300 verifies the address of the received connection establishment request with the address column 311 and obtains the matching address. In this case, it is the HDD (m+2), and the corresponding valid column 313 is "T" showing that it is valid, and the transfer port column 312 is the port (3). Thus, the expander 300 is able to determine that the connection establishment request should be transferred to the port (3), and that the transfer destination port is valid and operating normally.

Then, the expander 300 attempts to transfer the connection establishment request to the port (3). If another connection using the port (3) is already established, or if there is an establishment request from another port and the arbitration is lost, the expander 300 waits to transfer the connection establishment request by until these situations are resolved and transfer is enabled. If transfer is enabled, the connection establishment request is sent to the HDD (m+2), and the connection is established according to the state of the HDD.

Subsequently, let it be assumed that the port (0) received a connection establishment request to the HDD (m+32) as the HDD connected to a different cascade-connected expander 300. In this case, the expander 300 similarly refers to the forwarding table 310 (0) to determine the transfer destination, but there is no address that coincides with the HDD (m+32) in the address column 311. Thus, "Other" is selected. The valid column 313 corresponding to "Other" is "T" showing that it is valid, the transfer port column 312 is the port (5), and this connection establishment request is transferred to port (5). The port (5) is connected to the expander of the next tier, and this kind of comparison and transfer is conducted in the respective expanders, and ultimately arrives at the expander to be connected to the HDD (m+32).

As a result of providing "Other" to the address column 311 of the forwarding table 310 as described above, even in cases where the number of HDDs connected to a cascade is greater than the number of HDDs connected to one expander, comparisons in one expander will be few, and the connection establishment request can be transferred to the address even for those having a small capacity in the forwarding table 310. Nevertheless, this is a case where a plurality of expanders are connected in series, and, if connection is to be made with a tree structure or the like, an entry is also required for the HDDs that are not connected to that expander. If "F" is indicated in the valid column 313, this means that the transfer destination port is invalid, and a message indicating such invalidity is returned to the source of the connection establishment request.

The expander 300 also has a status register 320. The status register 320 is a register for storing the port status of that expander, status of the expander itself such as "operating normally" or "initializing," "detected errors" and error codes. This status register 320 can be read by establishing a connection with the address being the expander itself. It can also be read with a separate signal line (not shown).

FIG. 3 is a diagram showing an LDEV table 400 retained in the CHA 101. The LDEV table 400 may be stored in the CM 103, and may be referred to by the CHA 101 as needed. The LDEV table 400 shows a logical device (LDEV) showing the host request, and under which format the data according to the logical block address (LBA) is stored in which HDD 220.

The LDEV table 400 includes an LDEV column 410, an LBA column 420, an HDD number column 430, and a redundancy scheme column 440. When the CHA 101 receives an access request from the host computer 10, it checks the LDEV and LBA shown in the access request with the LDEV column 410 and the LBA column 420. Corresponding data is stored in the HDD 220 shown in the corresponding HDD number column 430 (or write data will be stored therein).

The reason why a plurality of HDD number columns 430 are provided to one pair of LDEV and LBA is to provide redundancy to the data in that area with a plurality of HDDs 220. The method of providing such redundancy is described in the redundancy scheme column 440. For example, if the redundancy scheme column 440 shows "RAID 1," this means that a redundancy of RAID level 1 based on mirroring is provided using two HDDs 220. If the redundancy scheme column 440 shows "RAID 10," this means that a redundancy of RAID level 1+0 based on mirroring two sets of pairs of connected HDDs 220 is provided.

Figure 4:
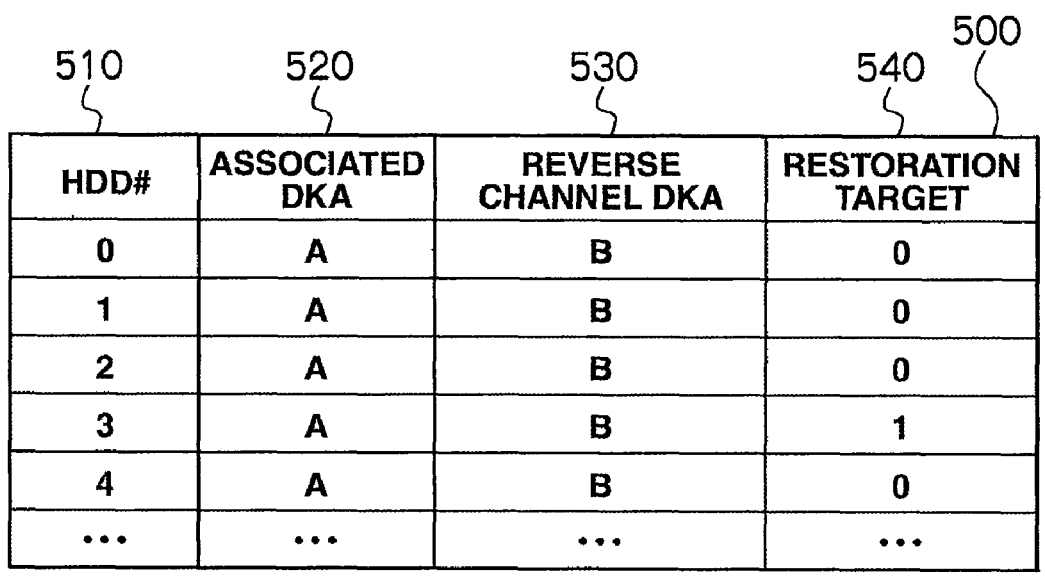
FIG. 4 is a diagram showing an HDD-DKA table retained in each CHA according to the same embodiment.

FIG. 4 is a diagram showing an HDD-DKA table 500 retained in the CHA 101. The HDD-DKA table 500 may also be stored in the CM 103, and, in such as case, the CHA 101 refers to the HDD-DKA table 500 stored in the CM 103 as necessary.

The HDD-DKA table 500 shows which HDD 220 is controlled by which DKA 102. The HDD-DKA table 500 includes an HDD number column 510, an associated DKA column 520, a reverse channel DKA column 530, and a restoration target column 540.

The associated DKA column 520 shows the ID of the DKA 102 controlling the HDD 220 corresponding to the HDD number column 510. The reverse channel DKA column 530 shows the DKA 102 controlling the cascade connected with the inter-cascade link 230 to the end of the cascade associated with the DKA 102 of the associated DKA column 520. The restoration target column 540 shows the HDD 220 storing data with less redundancy caused by a failure or the like described later. "0" shows that the redundancy is in tact, and "1" shows that the redundancy has decreased and it is desirable to recover the redundancy.

Based on these two tables; namely, the LDEV table 400 described above and this HDD-DKA table 500, the HDD number for storing the data is identified based on the LDEV and LBA of the access request from the host computer 10, and which DKA 102 is to perform HDD control processing is identified from that HDD number. In other words, as a result, the CHA 101 will be able to identify which DKA 102 it should exchange data with via the CM 103. The LDEV table 400 and the HDD-DKA table 500 are created with the SVP 150 at the time of initialization, and the SVP 150 retains the master information concerning all CHAs 101 and DKAs 102.

Figure 5:
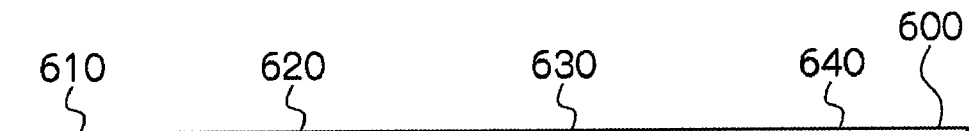
FIG. 5 is a diagram showing a topology table retained in each DKA according to the same embodiment.

FIG. 5 is a diagram showing a topology table 600 retained in the DKA 102. The topology table 600 may also be stored in the CM 103. In this case, the DKA 102 refers to the topology table 600 as necessary.

The topology table 600 includes a distance column 610, an expander column 620, an HDD number column 630, and a restoration target column 640. The expander column 620 shows the ID of the expander connected to the channel controlled by the DKA 102 retaining the topology table 600. The corresponding distance column 610 shows how many times that expander must pass through expanders to reach that expander. The HDD number column 630 shows the number of the HDD 220 connected to that expander. Since a plurality of HDDs 220 can be connected to one expander, there may be a plurality of HDDs number columns in one expander column 620. The restoration target column 640, as with the foregoing restoration target column 540, shows the HDD 220 storing data with less redundancy due to failure or the like.

The topology table 600 of a certain DKA 102 also shows the expander controlled by the reverse channel DKA connected with the inter-cascade link 230. Here, the distance it took to pass through the inter-cascade link 230 is shown in the distance column.

Figure 6:
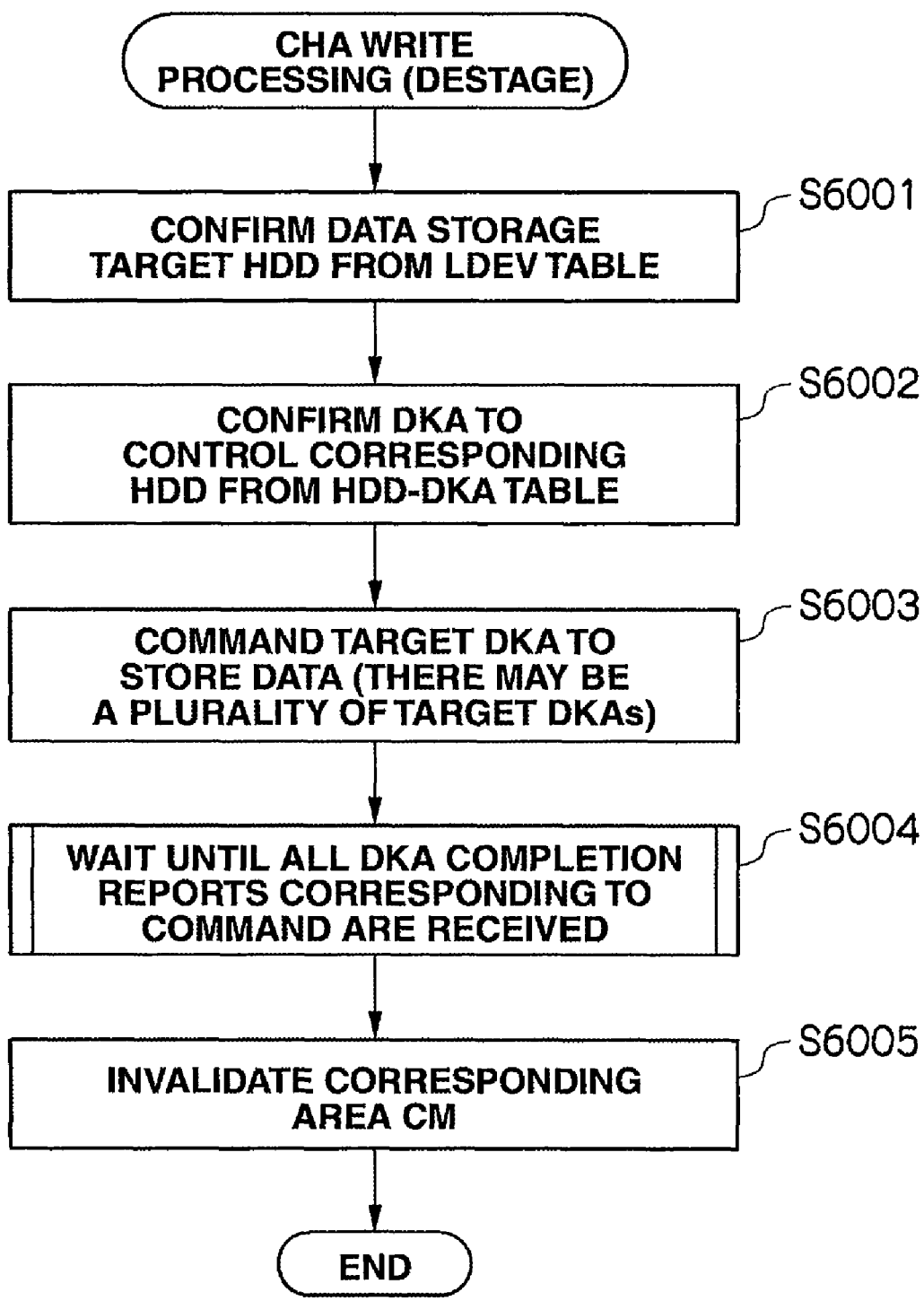
FIG. 6 is a flowchart of the CHA processing upon receiving a write request from a host computer according to the same embodiment.

FIG. 6 is a flowchart showing the processing of the CHA 101 upon receiving a write request from the host computer 10. When the CHA 101 receives a write request from the host computer 10, it temporarily stores data in the CM 103, and sends a completion report to the host computer 10. At an appropriate timing thereafter, the CHA commands the DKA to store (destage) the data of the CM 103 in the HDD 220. This flowchart shows the destage processing.

The CHA 101 obtains the number of the HDD 220 to store the data of the write request from the LDEV table 400 based on the LDEV and LBA shown in the write request of the destage target data (S6001). The CHA 101 refers to the HDD-DKA table 500 based on that HDD number, and confirms the DKA 102 to perform the control for storing the data in the corresponding HDD 220 (S6002). The CHA 101 thereafter issues a command (destage command) to the DKA 102 for storing data by notifying the CM address storing the data (S6003). If a plurality of HDDs 220 are shown in the LDEV table 400, and different associated DKAs are respectively shown in the HDD-DKA table 500, the command is issued to a plurality of DKAs 102.

Subsequently, the CHA 101 waits for the delivery of all completion reports from the DKAs 103 that responded to the command (S6004). Upon receiving all such completion reports, the CHA 101 invalidates the area of the CM 103 temporarily storing the corresponding data so that other data can be stored therein (S6005).

Figure 7:
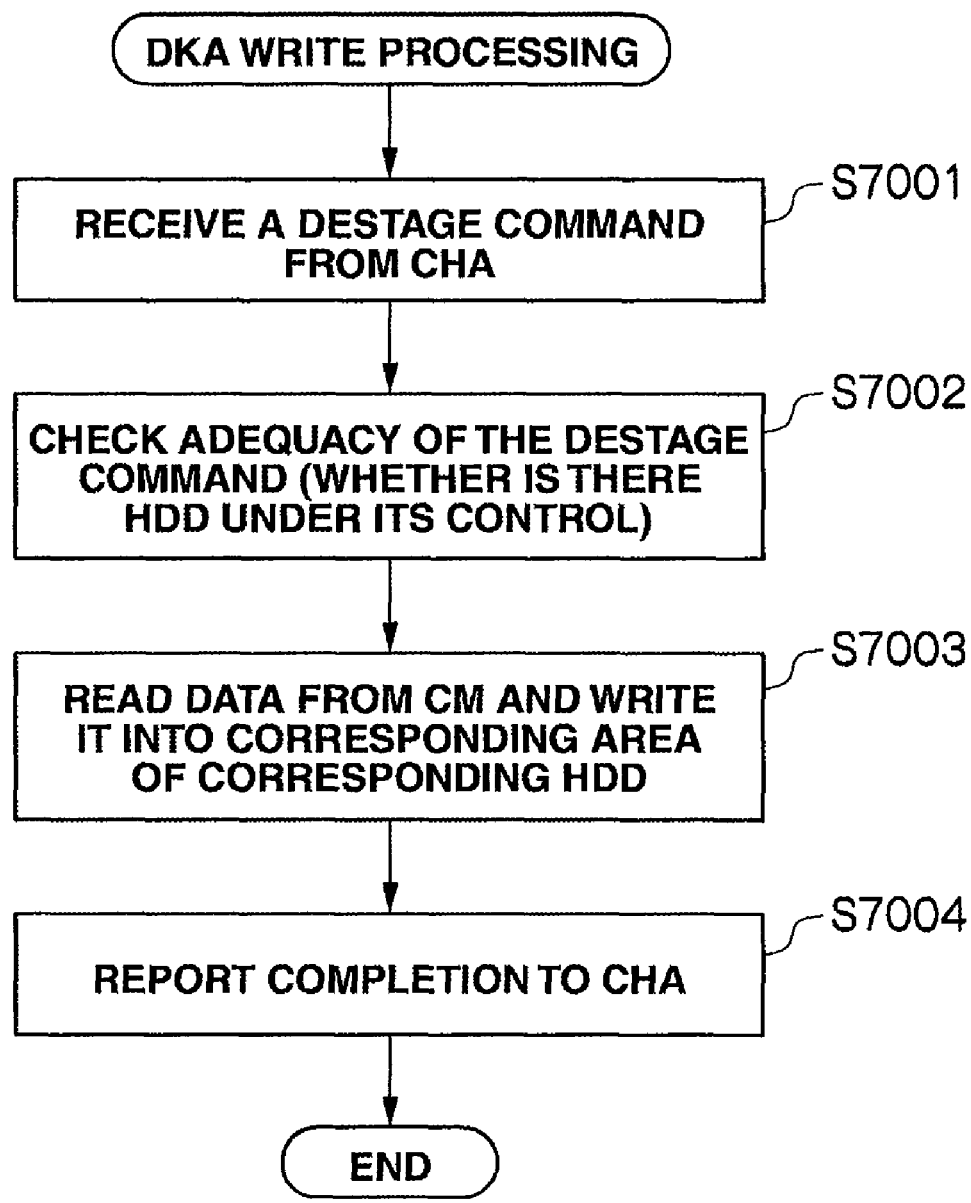
FIG. 7 is a flowchart representing the processing of a DKA that received a destage command according to the same embodiment.

FIG. 7 is a flowchart showing the processing of the DKA 102 that received the destage command issued from the CHA 101 at step S6003 of FIG. 6.

When the DKA 102 receives a destage command from the CHA 101 (S7001), it checks the adequacy of the command (S7002). If the command is in conflict with the controllable HDD 220 such as when the area designated for storing the data is in disagreement, since there is a possibility of a malfunction, an error notice is sent to the CHA 101 and the SVP 15. Subsequently, the DKA 102 reads the data from the CM 103, and writes such data into the corresponding area of the corresponding HDD 220 (S7003). When this writing is complete, a completion report is issued to the CHA 101 that issued the command (S7004).

The processing in the case of receiving a read request is now explained, and this explanation is based on the premise that the redundancy scheme is mirroring based on RAID 1 or the like. In other cases such as RAID 5 where in which HDD 220 the data is stored is determined based on the read target area, in the ensuing explanation, let it be assumed that the processing is performed based on the premise that there is only one HDD 220 storing data.

Figure 8:
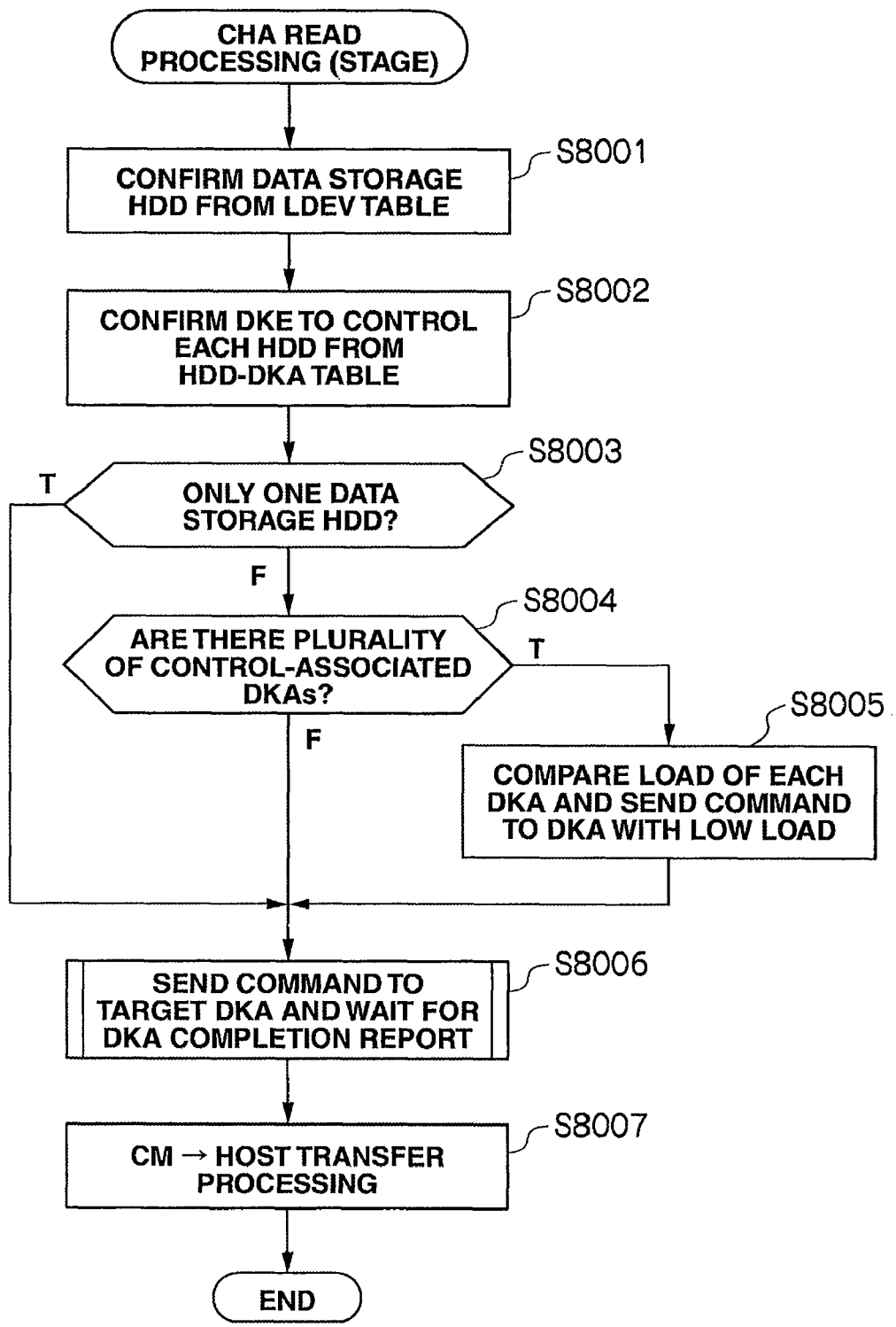
FIG. 8 is a flowchart of the CHA processing upon receiving a read request from a host computer according to the same embodiment.

FIG. 8 is a flowchart showing the processing of the CHA 101 upon receiving a read request from the host computer 10.

When the CHA 101 receives a read request from the host computer 10, it confirms whether that data has already been temporarily stored in the CM 103, and, if already stored, it replies that data to the host computer 10. Meanwhile, if that data has not yet been stored, the CHA 101 reads the data from the HDD 220 and stores (stages) it in the CM 103, and replies that data stored in the CM 103 to the host computer 10. This flowchart relates to a case where stage processing is required. The CHA 101 obtains the number of the HDD 220 storing the data of the read request from the LDEV table 400 based on the LDEV and LBA shown in the read request of the stage target data (S8001).

The CHA 101 refers to the HDD-DKA table 500 based on the HDD number, and confirms the DKA 102 to perform the control for reading the data from the corresponding HDD 220 (S8002). The CHA 101 determines whether that data is stored in a plurality of HDDs 220 or stored in one HDD 220 (S8003), and proceeds to step S8006 if the data is stored in one HDD 220. If the data is stored in a plurality of HDDs 220, the CHA 101 additionally determines whether there are a plurality of associated DKAs of the foregoing HDDs 220 (S8004). If there are a plurality of associated DKAs, the CHA 101 compares the loads among such plurality of DKAs, and selects the DKA with a low load as the DKA to which a command should be sent (S8005). The load may also be calculated based on the number of times a command was sent. Here, the process may also be simplified by selecting the DKA based on the load but fixing it based on the target area. In the foregoing determination, the DKA to receive the command is decided by necessity if there is only one associated DKA. The CHA 101 sends a command (stage command) to the target DKAs to receive a command, and waits for the completion reports from the DKAs (S8006). When the CHA 101 receives the completion report of the DKA 102, this means that the corresponding data has been stored in the CM 103. Thus, the CHA 101 reads the data from the CM 103, and replies that data to the host computer 10, which is the source that sent the read request (S8007).

Figure 9:
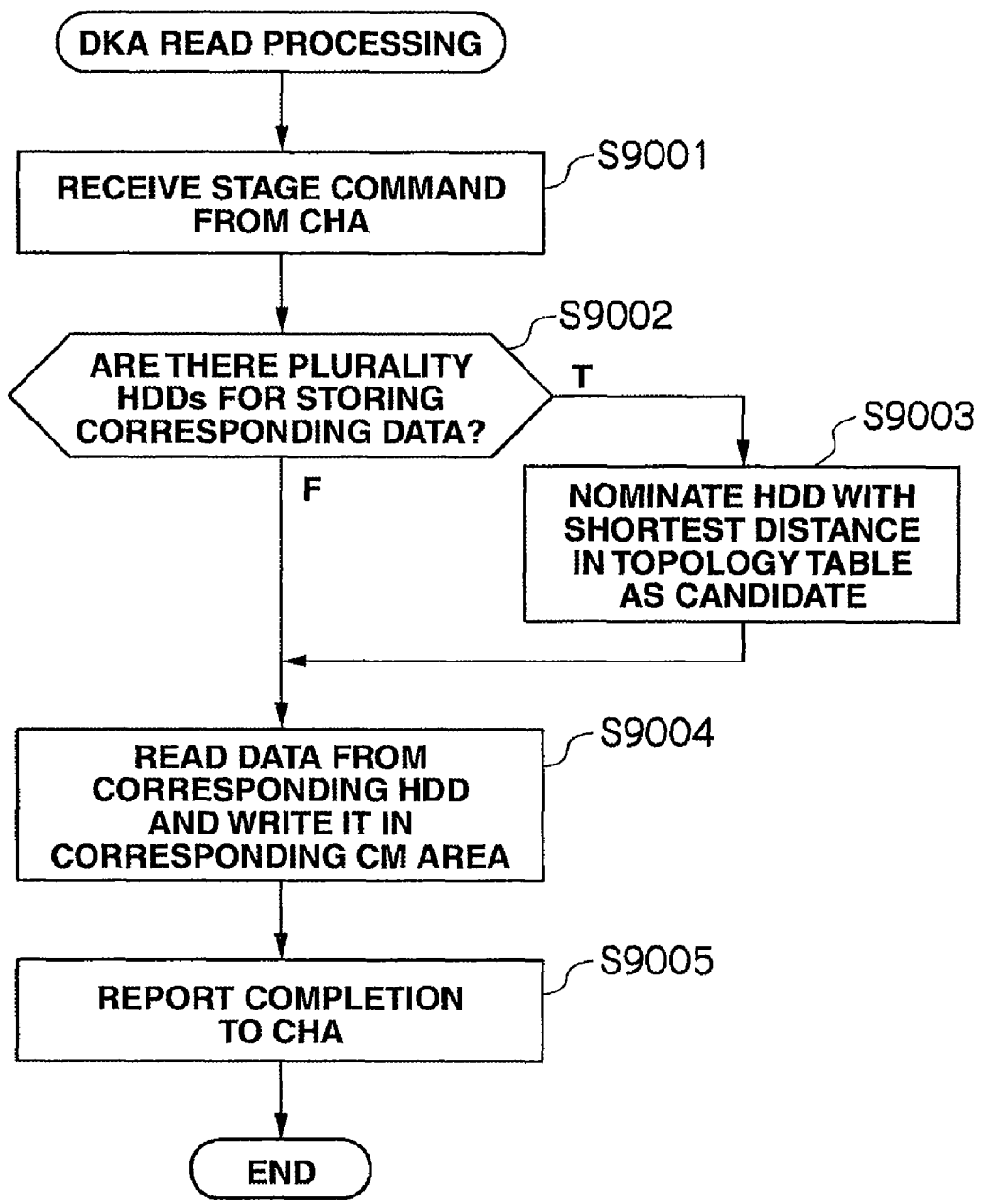
FIG. 9 is a flowchart representing the processing of a DKA that received a stage command according to the same embodiment.

FIG. 9 is a flowchart showing the processing of the DKA 102 upon receiving a stage command issued from the CHA 101 at step S8006 of FIG. 8.

When the DKA 102 receives a stage command from the CHA 101 (S9001), it determines whether that data is stored in one or a plurality of HDDs 22Q (S9002). If the data is stored in one HDD 220, the DKA 102 proceeds to the processing of S9004 with that HDD as the selected HDD 220. If the data is stored in a plurality of HDDs 220, the DKA 102 refers to the topology table 600, and selects a corresponding HDD 220 with the shortest distance (S9003). Here, the DKA 102 may also select a corresponding HDD 220 with the lowest load. In addition, the size of the load may be determined by comparing the number of times that each HDD 220 was designated. Subsequently, the DKA 102 reads the data from the selected HDD 220, and writes that data into the CM 103 area corresponding to the command (S9004). Then the DKA 102 sends a completion report to the CHA 101 to the effect that it has confirmed the data in the CM 103 (S9005).

Figure 10A:
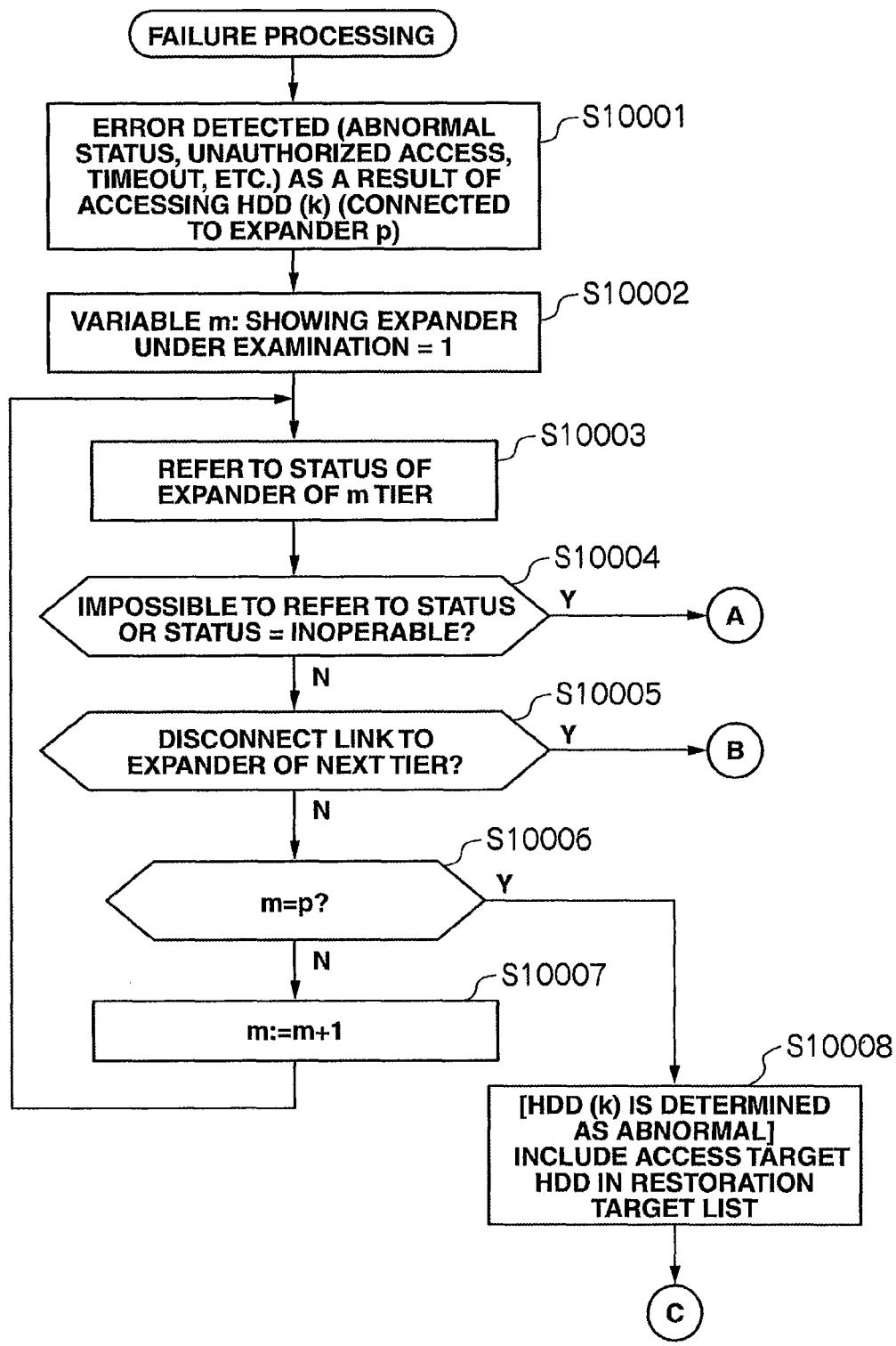
FIG. 10A is a flowchart showing a part of the failure processing to be performed by the DKA according to the same embodiment.
Figure 10B:
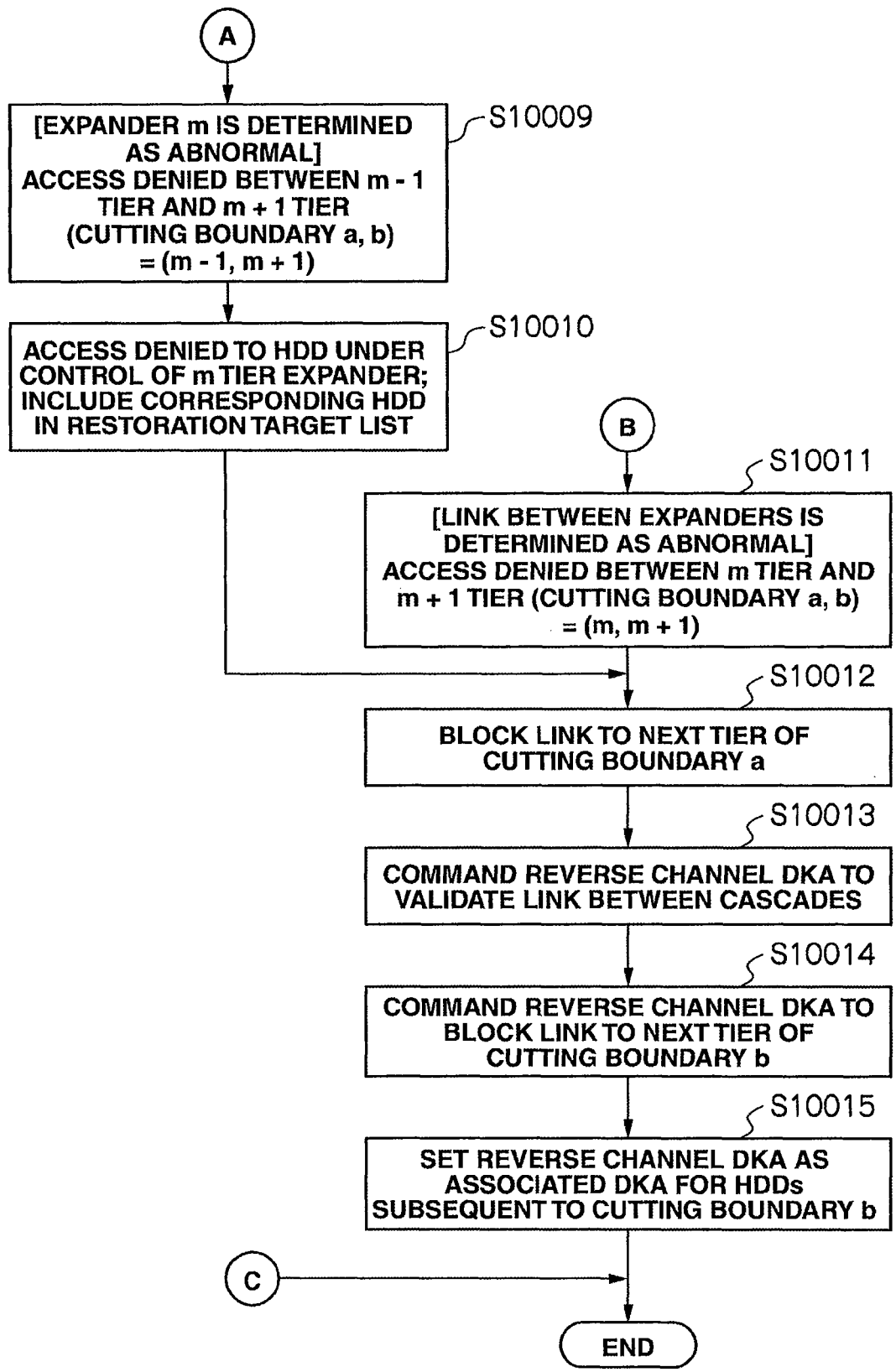
FIG. 10B is a flowchart showing the other part of the failure processing to be performed by the DKA according to the same embodiment.

FIG. 10A and FIG. 10B are flowcharts showing the failure processing to be performed by the DKA 102. Incidentally, FIG. 10A is a flowchart showing a part of the foregoing failure processing, and FIG. 10B is a flowchart showing the other part of the failure processing.

Let it be assumed that the DKA 102 detected an error as a result of the DKA 102 accessing the HDD 220. Here, let it also be assumed that the HDD (k) that is to be accessed is connected to an expander of the p tier from the DKA side (S10001). As a trigger for detecting an error, there is the reception of an abnormal status from the HDD 220, detection of unauthorized or illegal protocol, detection of timeout after a nonresponse, and so on.

Subsequently, the DKA 102 sets variable m to 1 (S10002). The status of the expander is checked in the subsequent processing, and variable m shows the expander being checked.

The DKA 102 thereafter refers to the status of the expander of the m tier (S10003). This processing can be executed by requesting the establishment of a connection with that expander as the address, and reading the status register 320 in that expander. In a different embodiment, the DKA 102 may also be enabled to read the status of the expander using a different signal line not shown.

If the read result shows the inoperability of the expander or the reading itself ends in a failure, the processing proceeds to step S10009 (S10004). If not, the DKA 102 determines whether the status shows the disconnection of a link to the expander of the next tier (S10005). This determination can be made based on the status of the port (5) in the type information shown in the status register 320 in the case of the expander 300 shown in FIG. 2.

If it is determined that the link is disconnected at step S10005, the processing proceeds to S10011. If it is determined that the link is not disconnected, the DKA 102 determines whether variable m showing the expander being checked and variable p showing the expander connected to the HDD 220, in which an error was detected, are equal (S10006). If the DKA 102 determines that the variables are not equal, it adds 1 to m (S10007), and returns to the processing of S10003. If the variables are equal, the DKA 102 deems that the failure occurred in the HDD 220 (k) to which access was attempted, includes the HDD 220 (k) n the restoration target list, and then ends the processing (S10008). The processing of including the HDD "in the restoration target list" is the processing of setting "1" in the restoration target column 540 of the HDD-DKA table 500 of all CHAs 101 and the restoration target column 640 of the topology table 600 of all DKAs 102 corresponding to that HDD 220. Thus, the DKA 102 that detected the error notifies the target HDD to the other CHAs 101 and DKAs 102.

If it is discovered that the expander is abnormal as a result of reading the status register 320 (if it is "T" at S10004), the DKA 102 deems that the expanders of m−1 tier and m+1 tier are inaccessible (S10009). Here, the inaccessible locations are referred to as a cutting boundary, and indicated as (a, b)=(m−1, m+1). Further, it is deemed that all HDDs 220 connected to the m tier expanders are also inaccessible, and processing for including these HDDs 220 in the restoration target list is performed (S10010).

The DKA 102 additionally blocks the link to the next tier of the cutting boundary a (S10012). Specifically, access is made with the expander a as the address, and the port valid bit of the target port of the expander is turned off. Subsequently, a command for validating the inter-cascade link 230 is issued to the reverse channel DKA of the DKA in which a failure was detected (S10013). Then, the DKA 102 blocks the link to the next tier of the cutting boundary b via the reverse channel (S10014). Further, the HDD-DKA table 500 is changed, the associated DKA and the reverse channel DKA of the HDD 220 after the cutting boundary b are switched, and the past reverse channel DKA is set to be the associated DKA (S10015).

If the link to the next tier expander is disconnected ("T" at S10005), the DKA 102 sets the cutting boundary to (a, b)=(m, m+1) (S10011), and then performs the processing of step S10012 onward.

As a result of performing this processing, even if a failure occurs in the cascade-connected expanders 201A to 206A, 211A to 216A or the links between the respective expanders, it is possible to limit the area that will be influenced by the failure, maintain data redundancy, and secure the availability of the storage system 1.

Figure 11:
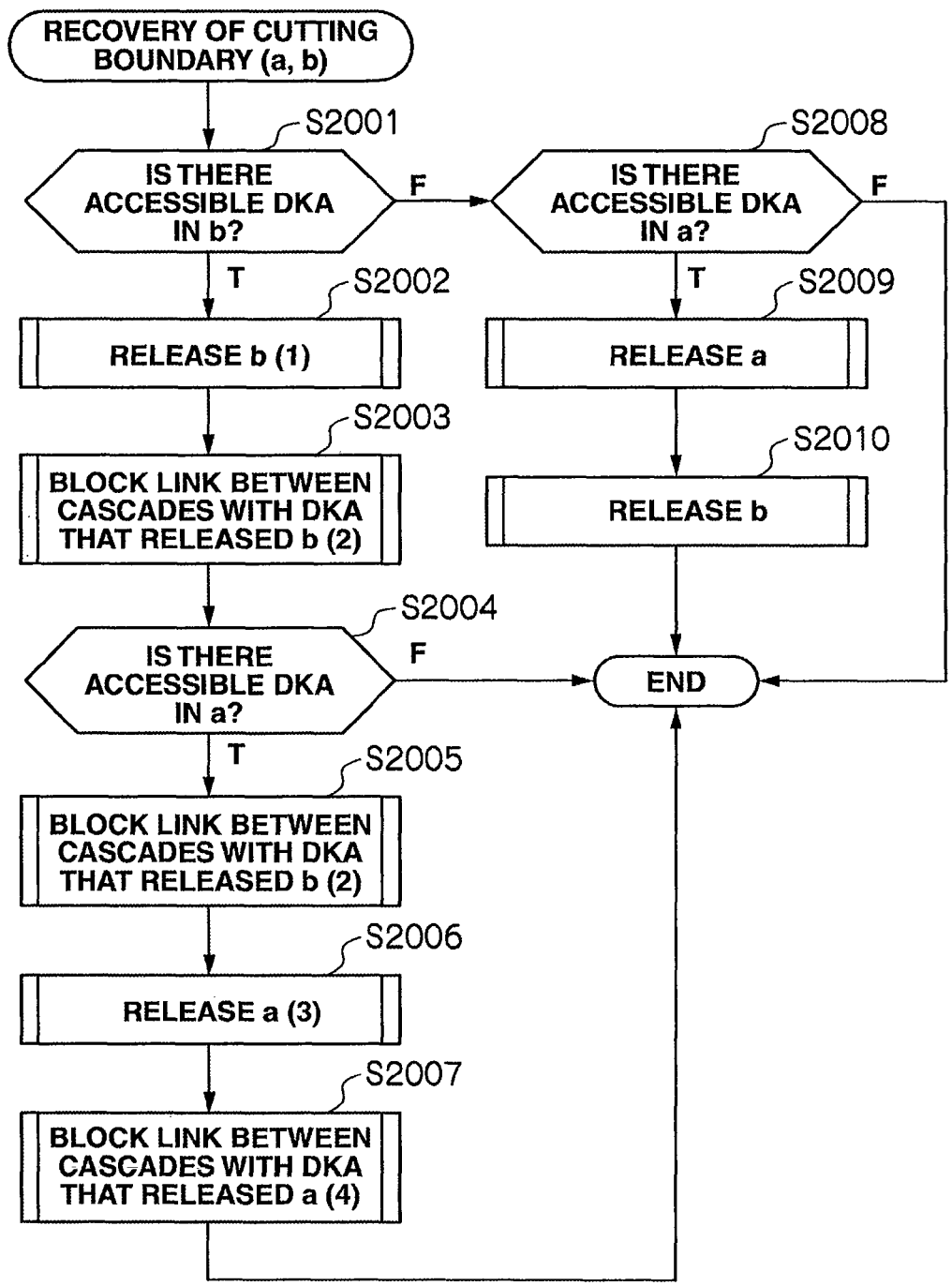
FIG. 11 is a flowchart of recovery processing when the cause of failure in the expander or in the link between the expanders has been eliminated according to the same embodiment.

FIG. 11 is a flowchart of the recovery processing when the cause of failure in the expanders 201A to 206A, 211A to 216A or the inter-expander link has been eliminated. This processing is executed by the CHA 101 of the storage controller 100 based on a command from the SVP 150. The CHA 101 issues a command to the DKA 102 according to this processing to block or release the inter-cascade link 230. Nevertheless, this processing may be executed with a component other than the CHA so as long as it can access information required for making various determinations and issue a command to the DKA 102.

Figure 12:
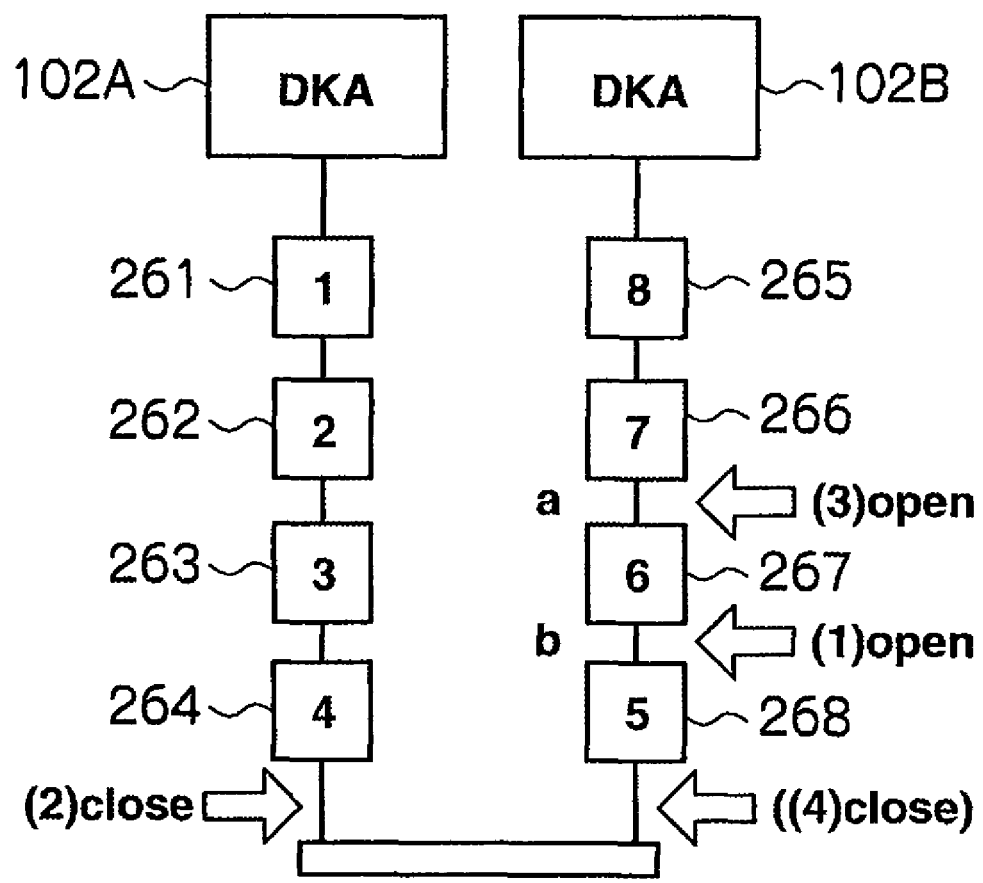
FIG. 12 is a diagram showing the configuration of a link between the expanders explained in FIG. 11.

FIG. 12 is a diagram showing the configuration of the links between the expanders explained in the flowchart of FIG. 11. As shown in FIG. 12, four expanders 261 to 264 are connected in this order from the DKA 102A, four expanders 265 to 268 are connected in this order from the DKA 102B, and the expanders 264, 268 at the end are connected with an inter-cascade link.

As shown in FIG. 12, the recovered cutting boundary in front when viewing the inter-cascade link from the DKA 102 is shown as "a" and the recovered cutting boundary in the back is shown as "b." Foremost, the CHA 101 determines whether there is a DKA 102 that is able to access "b" (S2001). If accessible, it releases "b" (S2002), and that DKA 102 blocks the inter-cascade link 230 (S2003). If inaccessible, the CHA 101 further determines whether there is a DKA 102 that is able to access "a" (S2008), and ends the processing if there is no such DKA 102. If there is a DKA 102 that is able access "a," it releases "a" and "b" with that DKA 102 (S2009, S2010), and then ends the processing.

After step S2003, the CHA 101 determines whether there is a DKA 102 that is able to access "a" (S2004). If there is no DKA 102 that is able to access "a," the CHA 101 ends the processing. If there is a DKA 102 that is able to access "a," the DKA 101 that released "b" at step S2002 blocks the inter-cascade link 230 (S2005). This is in order to logically separate the inter-cascade link 230 once again, cause the channels on the HDD 220 side of the DKAs 102A, 102B to become independent, and thereby secure redundancy.

Subsequently, the CHA 101 releases "a" (S2006), blocks the inter-cascade link 230 with that DKA 102, and then ends the processing (S2007). Nevertheless, in a mode where there is an inter-cascade link setup signal line 243, since the setting at step S2005 can be reflected, the procedures at step S2007 are not required. After the processing of FIG. 11 or when the HDD 220 recovers from its failure, data is recovered according to the redundancy scheme.

Figure 13:
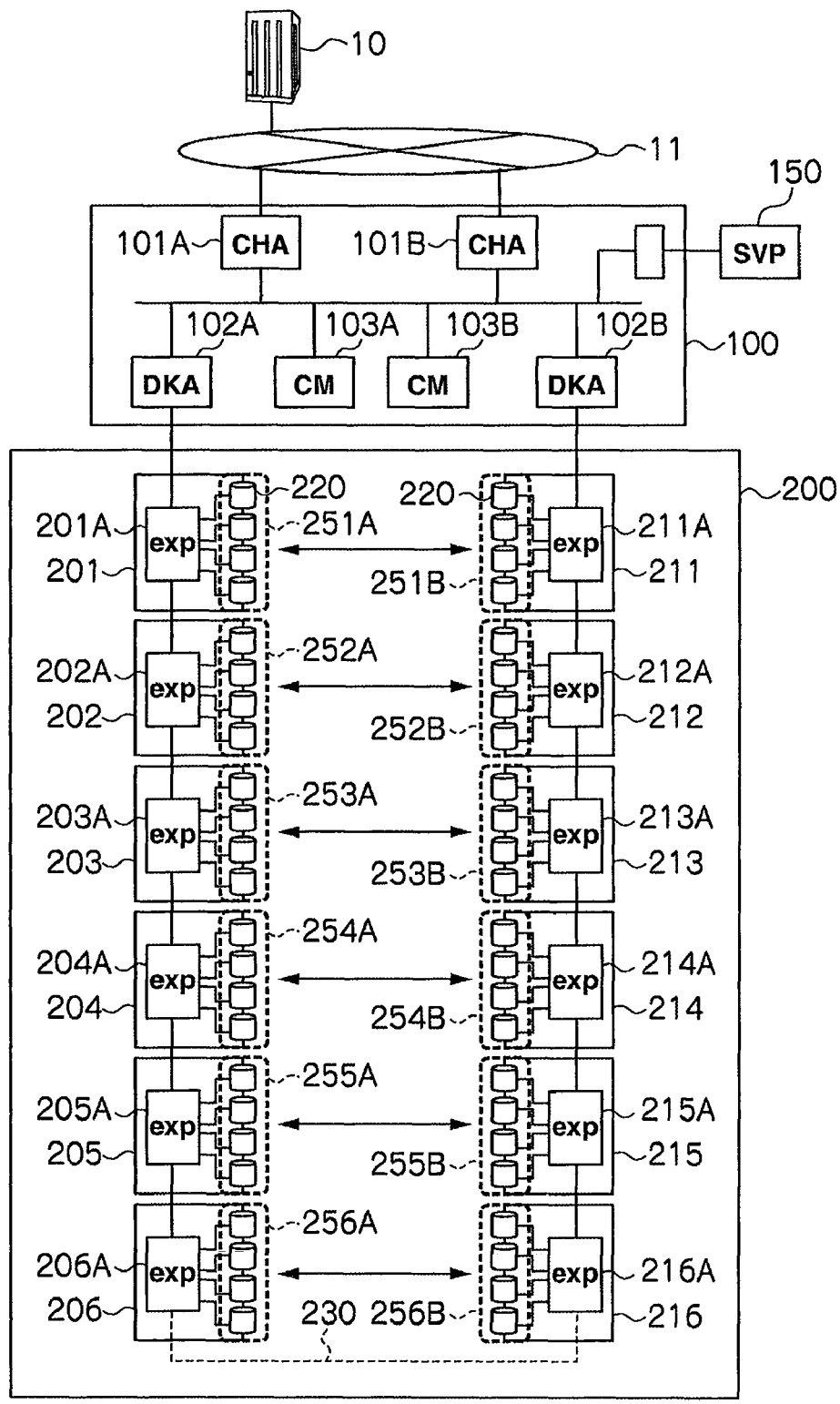
FIG. 13 is a diagram showing an example of which HDD the redundant data should be stored according to the same embodiment.

FIG. 13 is a diagram showing an example of deciding in which HDD 220 the redundant data should be stored. Here, mirroring shall be used as the method of making the data redundant. In FIG. 13, data is mirrored in the HDDs 220 in which the distance from the DKA 102 is equal. Specifically, the redundant groups 251A to 256A and the redundant groups 251B to 256B are respectively mirrored. Like this, the redundant groups are arranged to be in line-symmetry between the two cascades. Thereby, certain data that is made redundant will be located at the same position, and will be easier to control in the storage system 1.

Figure 14:
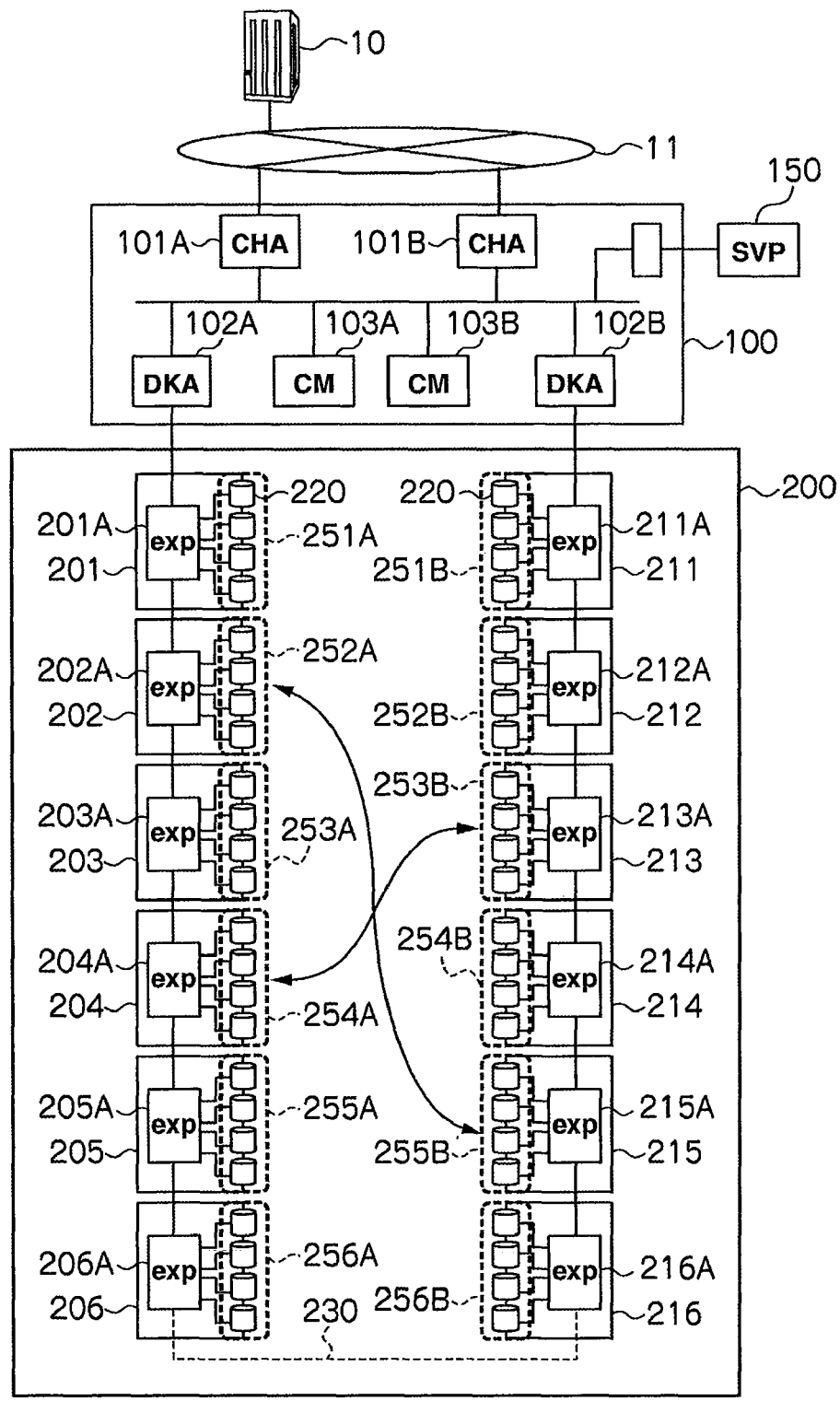
FIG. 14 is a diagram showing another example of which HDD the redundant data should be stored according to the same embodiment.

FIG. 14 is a diagram showing another example of deciding in which HDD 220 the redundant data should be stored. Although mirroring is also used in this example as the method of making the data redundant, in this case, redundant data of data stored in the HDD 220 that is the closest from one DKA is stored in the HDD 220 that is the farthest from the other DKA so that a point-symmetry is realized at the intermediary point between the cascades. For example, as shown in FIG. 14, the redundant groups 252A and 255B, and the redundant groups 254A and 253B are mirrored. As a result of adopting this kind of configuration, it is possible to inhibit the deterioration in redundancy caused by an expander failure. This is explained with reference to FIG. 15 and FIG. 16.

Figure 15:
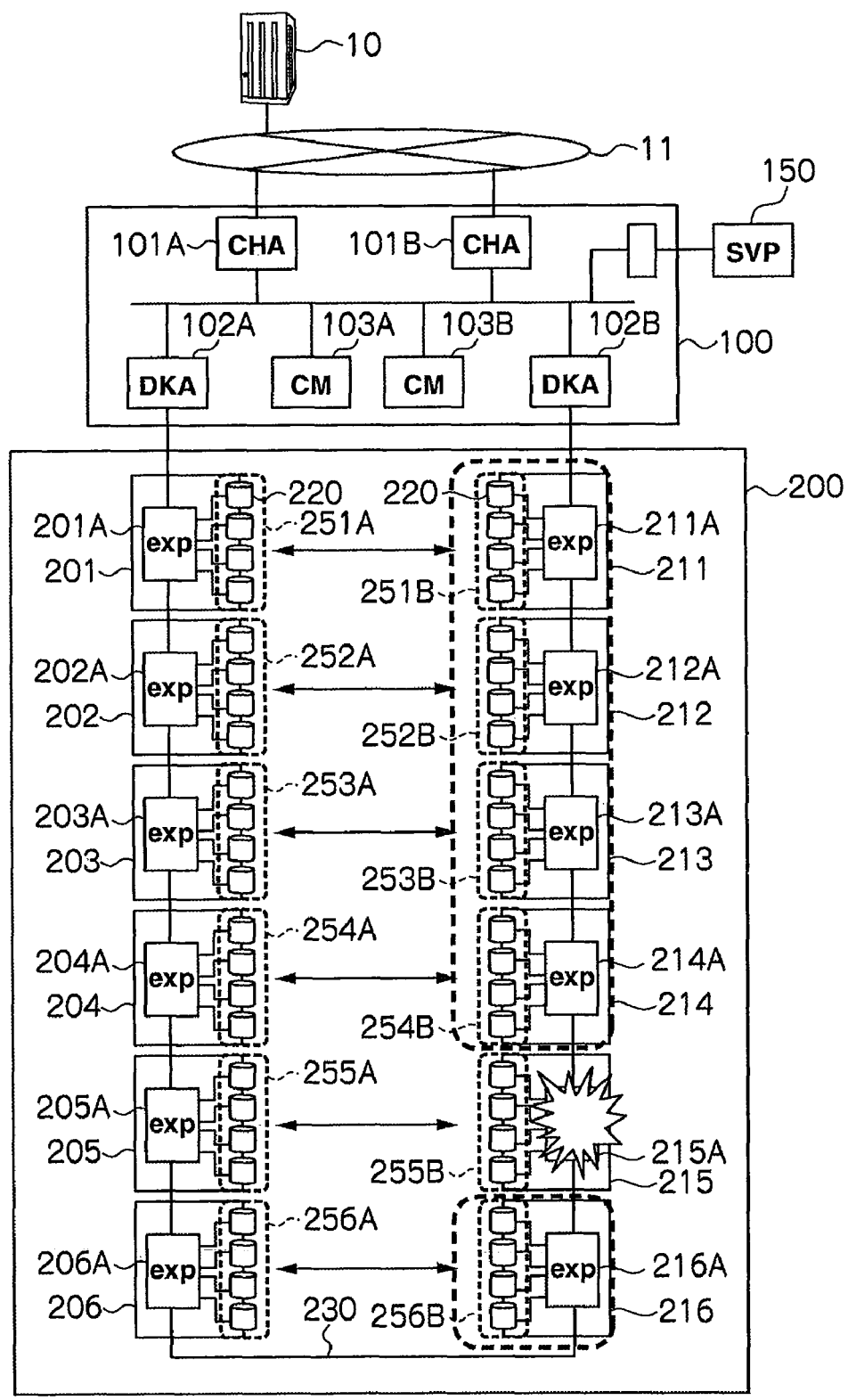
FIG. 15 is a diagram showing the scope of failure in a line-symmetric mirroring configuration of according to the same embodiment.

FIG. 15 is a diagram showing the range of failure in the line-symmetric mirroring of FIG. 13. Here, let it be assumed that expanders (201A to 206A, 211A to 216A) of six tiers on one side are cascaded, and valid data available to the host computer 10 is stored in all HDDs 220. Let it be further assumed that the expander 215F of the fifth tier from the DKA 102B on the right side is subject to a failure. Then, the inter-cascade link 230 becomes valid as a result of the foregoing control, and the number of inaccessible HDDs 220 can be suppressed.

Here, a case where another expander failure occurred is considered. As explained with reference to FIG. 15, even if an additional failure occurs to any one of the expanders 211A to 214A, 216A, the DKA 102 is able to access the HDD 220 connected to the expanders 201A to 206A, and access all data. Nevertheless, for instance, if an additional failure occurs in the expander 204A, the expanders 204A, 206A, 216A will also become inaccessible, and the DKA 102 will not be able to access the data stored in the HDD 220 connected to such failed expanders. In other words, an additional expander failure can only be tolerated up to five expanders in this case. So if the number of tiers from the DKA 102 to the inter-cascade link 230 is n tiers, the number of expanders that can tolerate an additional failure will be n−1.

Figure 16:
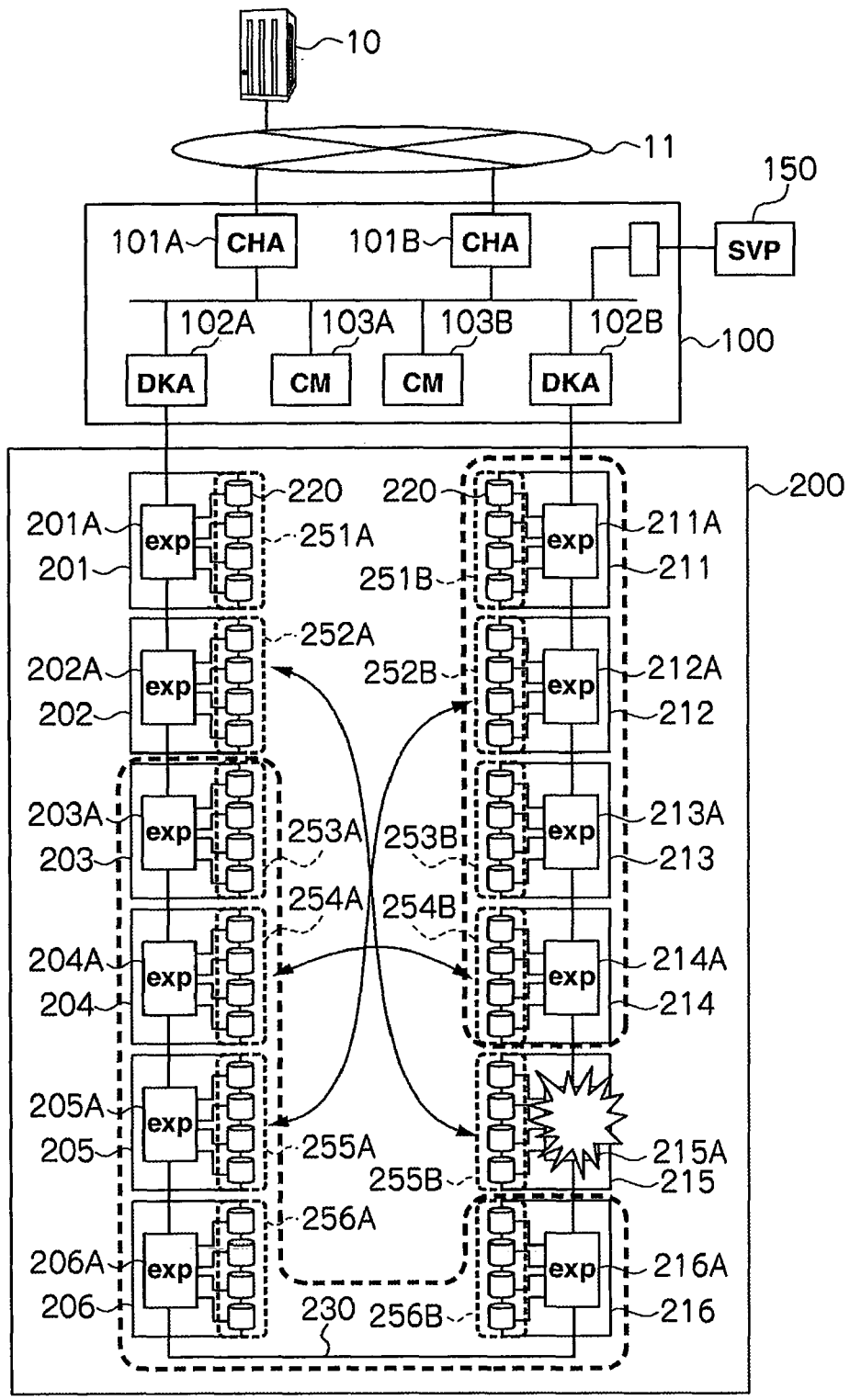
FIG. 16 is a diagram showing the scope of failure in a point-symmetric mirroring configuration according to the same embodiment.

FIG. 16 is a diagram showing the range of failure in the point-symmetric mirroring configuration of FIG. 14. In this example also, the same case as the case explained with reference to FIG. 15 is considered. In this example, access to all data can be maintained even if an additional failure occurs to a total of nine expanders including the expanders 203 to 206 in addition to the expanders 211 to 214, 216. In this case, if the number of tiers from the DKA 102 to the inter-cascade link 230 is n, and the expander in which the initial failure occurred is p tier, the number of expanders that will be able to tolerate an additional failure will be n+P−2. Considering that P is $1 \leq p \leq n$, it will be $n+p-2 \geq n-1$ in all cases, and the point-symmetric layout is able to tolerate an additional expander failure at a ratio of roughly equal to twice that of a line-symmetric layout.

Figure 17:
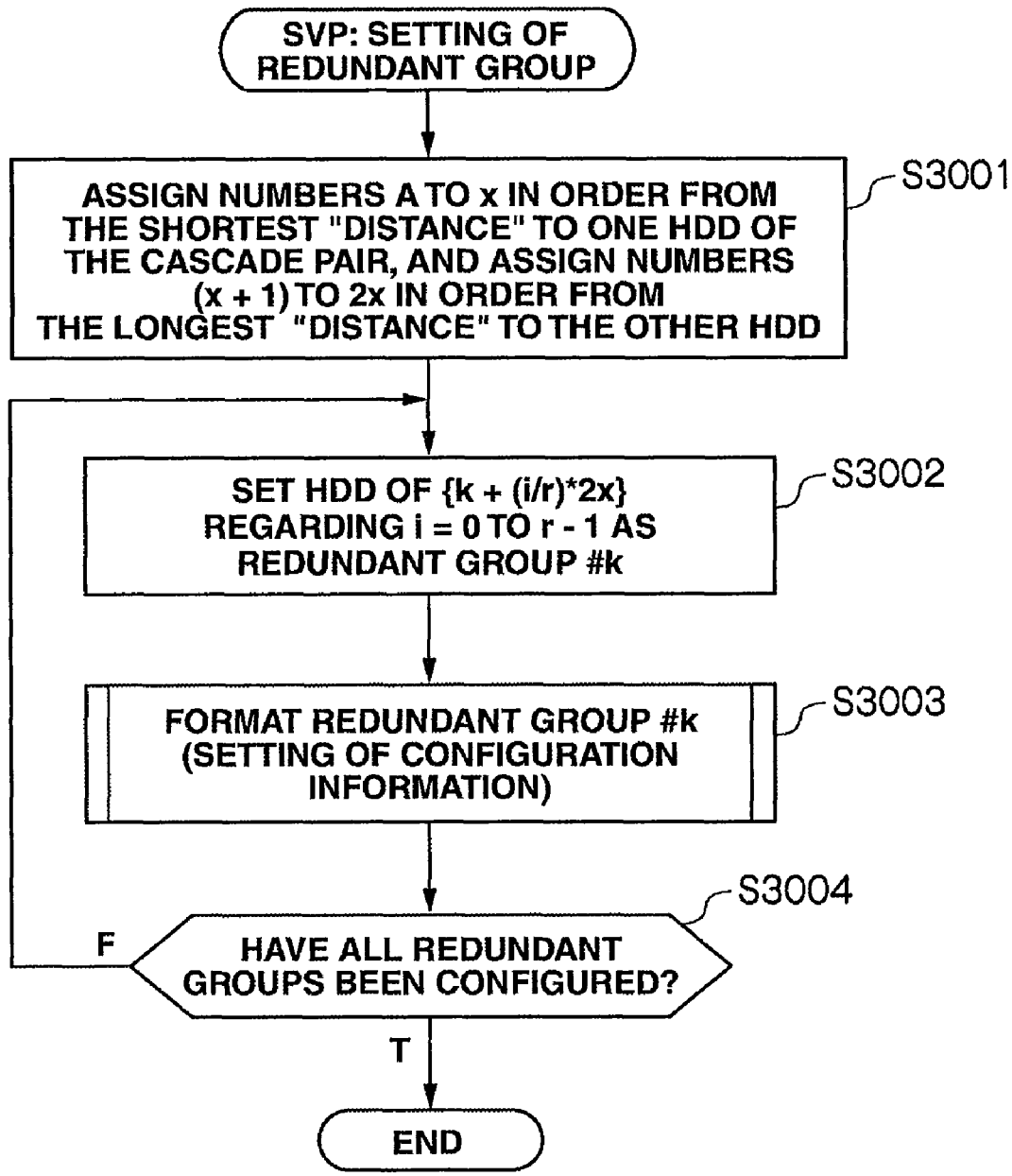
FIG. 17 is a flowchart of the processing to be executed by the SVP for creating an allocation of a point-symmetric layout according to the same embodiment.
Figure 18:
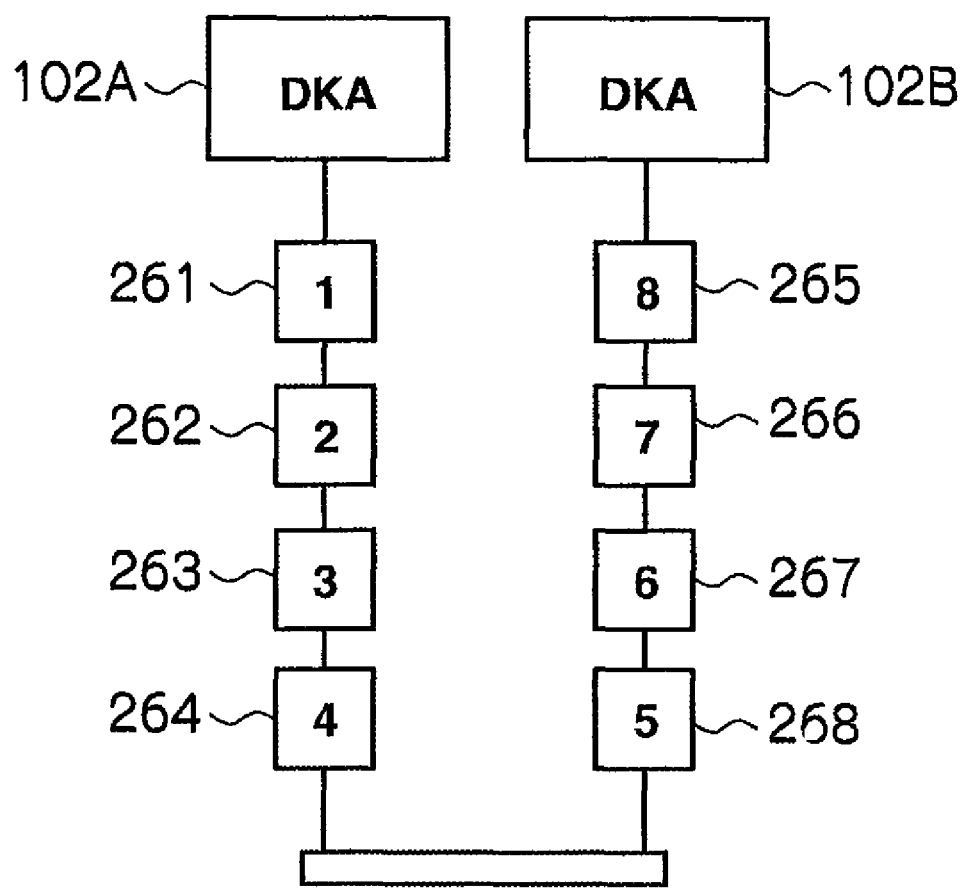
FIG. 18 is a diagram showing a layout example of the expanders configuring a cascade pair according to the same embodiment.

FIG. 17 is a flowchart of the processing to be executed by the SVP 150 for creating the allocation of the point-symmetric layout. The SVP 150 performs the following processing based on the user's operations. Incidentally, FIG. 18 is a diagram showing a layout example configuring the cascade pair.

The SVP 150 assigns numbers from 1 to x in order from the shortest distance from the DKA 102 to one HDD 220 of the cascade pair, and assigns numbers from x+1 to 2x in order from the longest distance of the other HDD 220 connected to the other cascade (S3001). However, since there may be cases where the distance is the same, the order is determined according to the ID order or the like in such a case. Taking the cases of FIG. 13 to 16 as an example, if four HDDs 220 are connected to one expander, this will be x=4n.

Subsequently, the SVP 150 determines the member of the redundant group as the group of the HDD 220 for making the data redundant and storing such data. If the number of members of that redundant group is "r," r number of HDDs 220 of $k+(i/r) \times 2 \times (0 \leq i \leq r-1)$ is made to be a member of the redundant group of number k with a previously assigned number (S3002).

Subsequently, the SVP 150 commands the formatting of the redundant group of number k or sets the configuration information (S3003). The SVP 150 determines whether all redundant groups have been configured (S3004), and repeats the processing of S3002 onward if all redundant groups have not been configured. If all redundant groups have been configured, the SVP 150 ends this processing.

Figure 19:
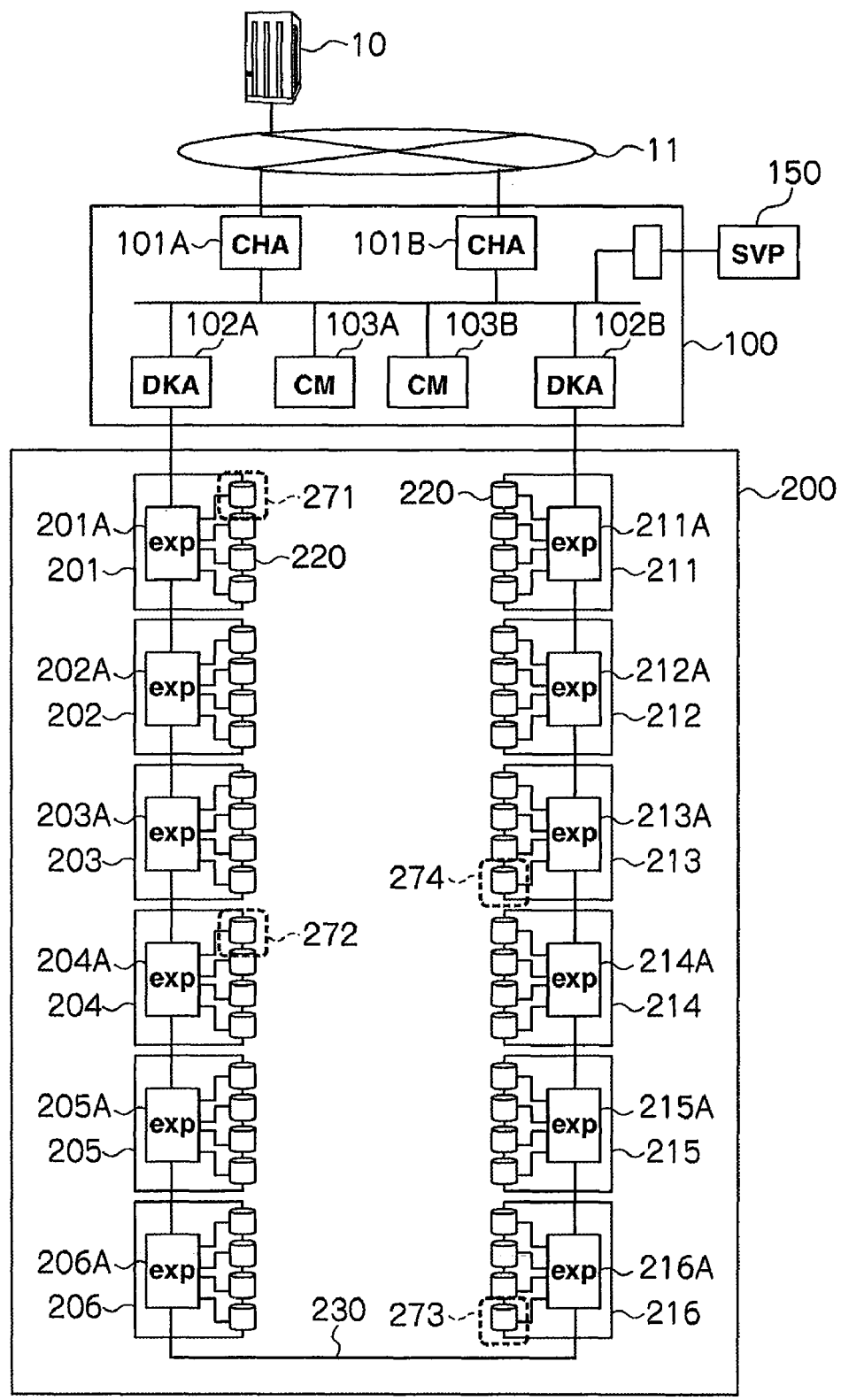
FIG. 19 is a diagram showing an example of a certain redundant group created based on the processing of FIG. 17.

FIG. 19 shows an example of a certain redundant group that is created based on the processing of FIG. 17. This shows an example of a redundant group of RAID 5 (3D+1P). As shown in FIG. 19, the redundant group is configured from four HDDs 220 of 271 to 274.

According to the storage system 1 of the first embodiment, it is possible to provide expandability more inexpensively as well as provide high availability, and such high availability can be provided using a SAS interface capable of connecting a plurality of HDDs 220 inexpensively.

Second Embodiment

Figure 20:
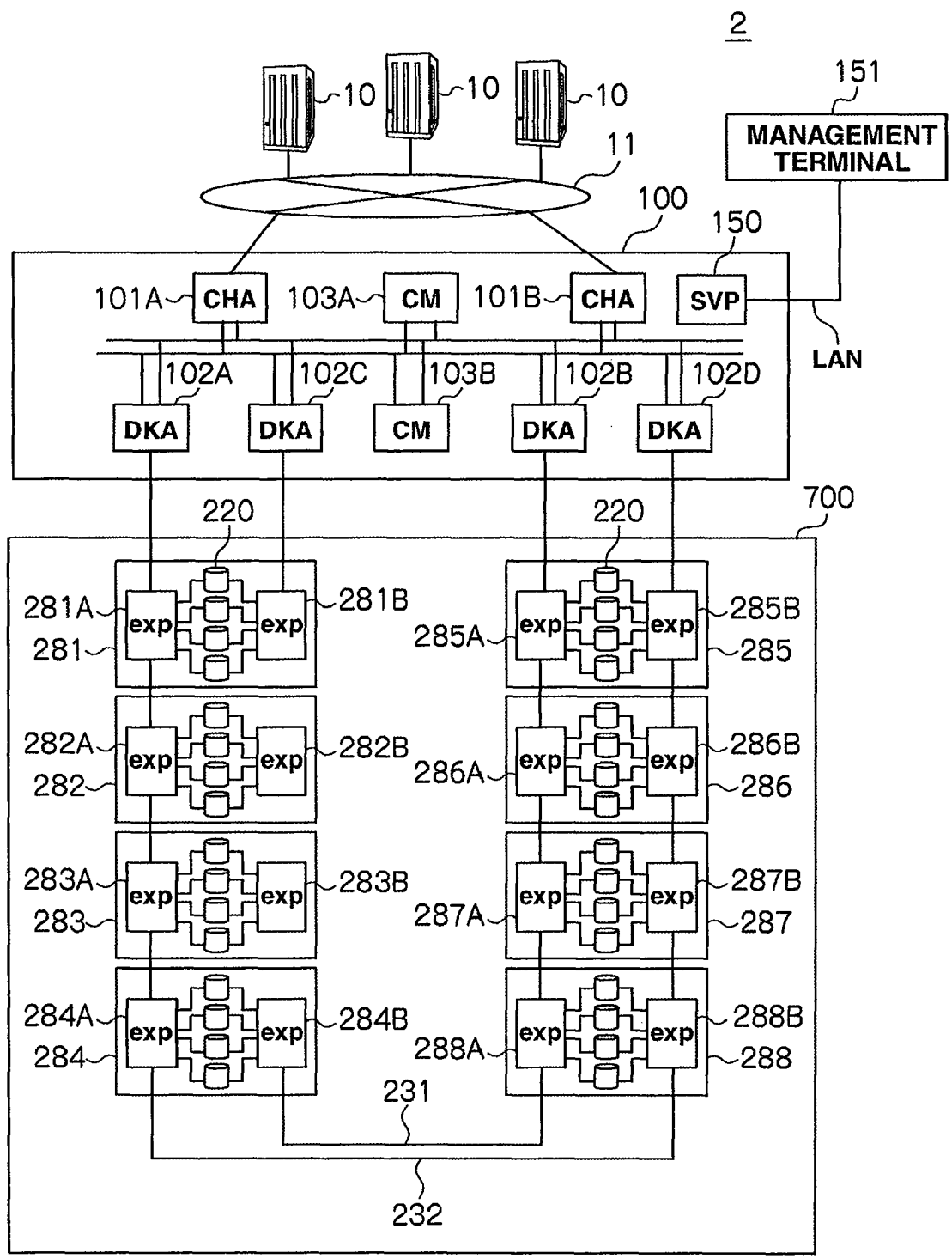
FIG. 20 is a block diagram of a storage system according to a second embodiment of the present invention.

FIG. 20 is a block diagram of the storage system 2 according to a second embodiment of the present invention. In the second embodiment, in order to achieve even higher availability, a case is explained of adopting an HDD 220 comprising two ports in the storage system of the first embodiment. Using these two ports, the HDD 220 is connected to the two expanders of expanders 281A to 288A, B. Four DKAs 102A to 102D are provided in the storage controller 100 for controlling these expanders.

As a result of providing four DKAs 102A to 102D, connecting the HDD 220 to two expanders, connecting these expanders in a cascade (expanders 281A, B to 284A, B, 285A, B to 288A, B), and connecting the cascades with inter-cascade communication links 231, 232, in addition to improving the fault tolerance of the expanders, the fault tolerance of the DKAs can be achieved in the storage system.

Third Embodiment

Figure 21:
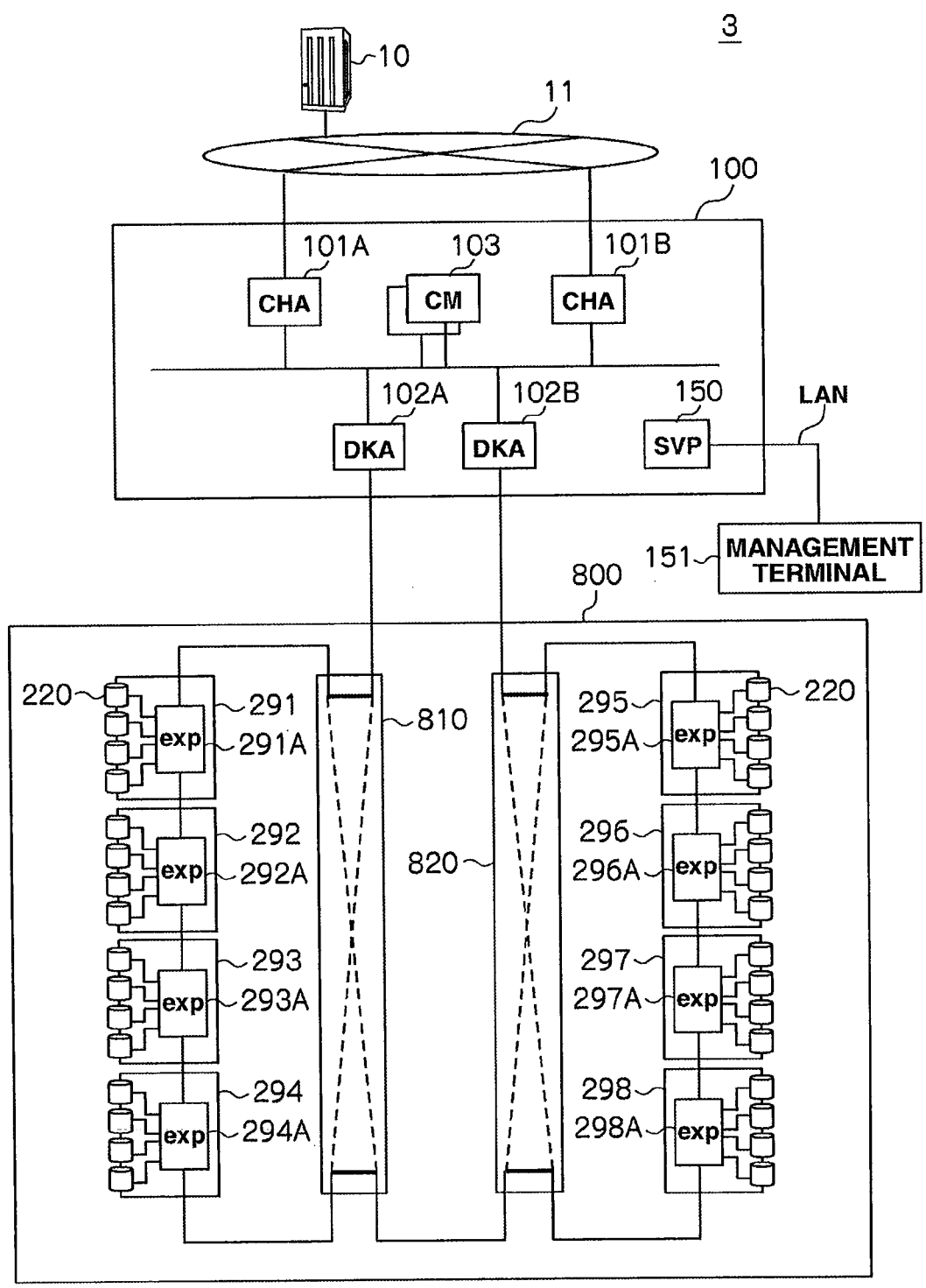
FIG. 21 is a block diagram of a storage system according to a third embodiment of the present invention.

FIG. 21 is a block diagram of the storage system 3 according to a third embodiment of the present invention. Although the cascades were connected with the inter-cascade link 230 in FIG. 1, with the storage system 3, the cascades are connected with two disk-side channel selectors 810, 820.

The disk-side channel selector 810 is a selector of four ports; namely, two ports on either side of one cascade (expanders 291A to 294A), one port of the disk-side channel of the DKA 102A, and one port to be connected to one port of the disk-side channel selector 820 configuring a pair. The disk-side channel selector 820 is configured substantially the same.

The disk-side channel selectors 810, 820 have two types of connection modes. One connection mode is a mode that connects one port of the disk-side channel and the port of one end of the cascade, and connects one port of the disk-side channel selector configuring the pair and the port of the other end of the cascade (shown with a solid line in FIG. 21). The other connection mode is a mode that reverses the ends of the cascade to be connected to the disk-side channel selector configuring a pair with the disk-side channel (shown with a dotted line in FIG. 21). For the sake of convenience in explanation, the former is referred to as mode A, and the latter is referred to as mode B. The modes can be set independently with the two disk-side channel selectors 810, 820, and can be switched based on a command from the SVP 150 according to the status of failure. The SVP 150 selects the mode so that the number of HDDS 220 to be associated with the two DKAs 102A, 102B becomes equal as much as possible from the perspective of load balancing. An example of selecting modes is explained with reference to FIG. 22 to FIG. 24.

Figure 22:
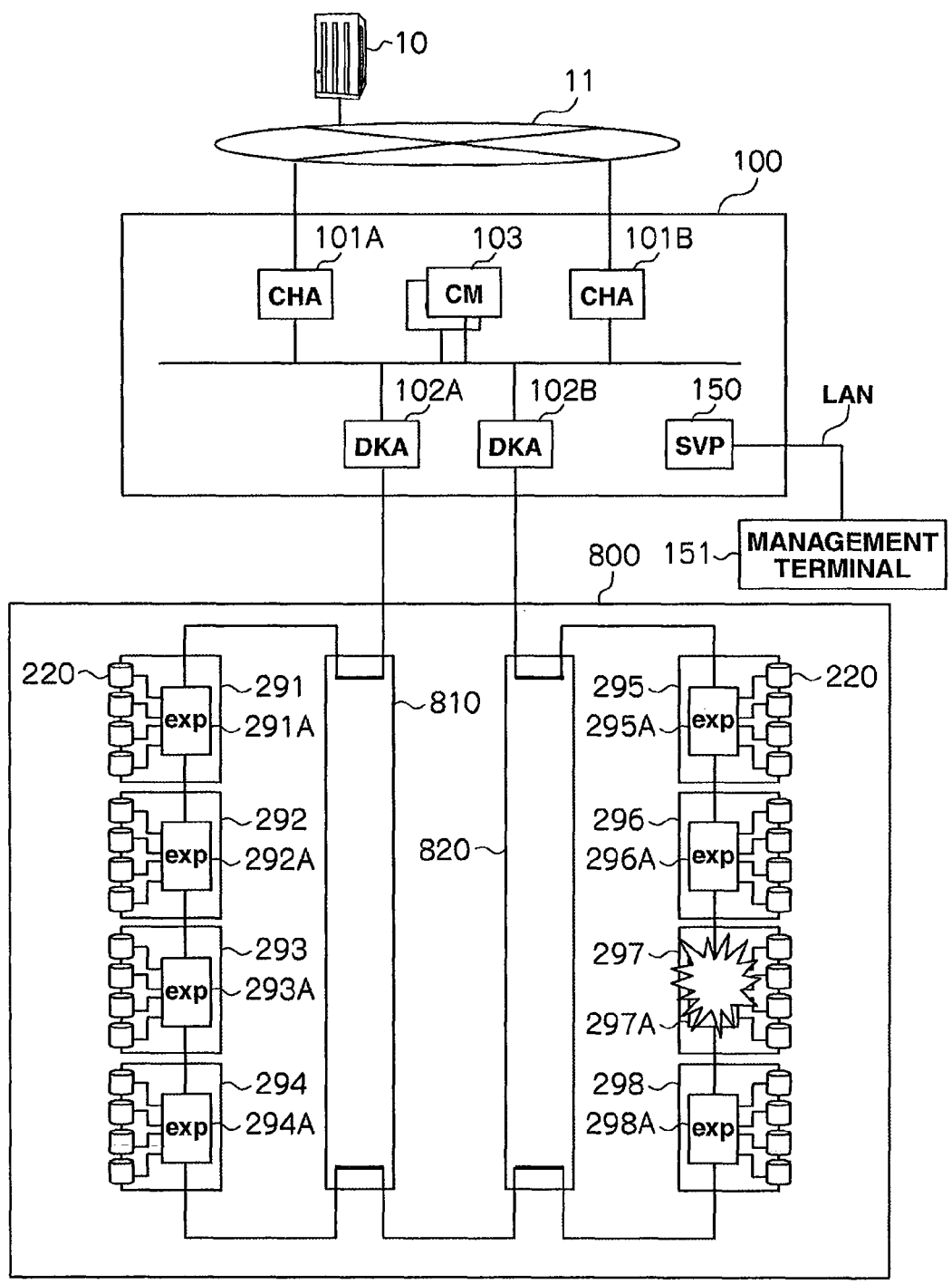
FIG. 22 is a diagram showing a part of a mode selection example of a disk-side channel selector according to the same embodiment.

FIG. 22 is a diagram showing an example of the mode selection by the disk-side channel selectors 810, 820. FIG. 22 shows a case where a failure occurred in the expander 297A. The mode selection of the disk-side channel selectors 810, 820 and the number of HDDs associated with the DKAs 102A, 102B in this case are represented as M (m0, m1)= D (n0, n1). If mode A is selected by the disk-side channel selector 810 and mode B is selected by the disk-side channel selector 820, this means that the DKA 102A is associated with twenty HDDs 220, and the DKA 102B is associated with eight HDDs 220 (M (A, A)=D (20, 8)). The remainder will be M (A, B)=D (24, 4), M (B, A)=D (20, 8), M (B, B)=(24, 4). Thus, M (A, A) or M (B, A) is selected. If it is the same number, a point-symmetric redundant group as shown in FIG. 14 should be selected.

Figure 23:
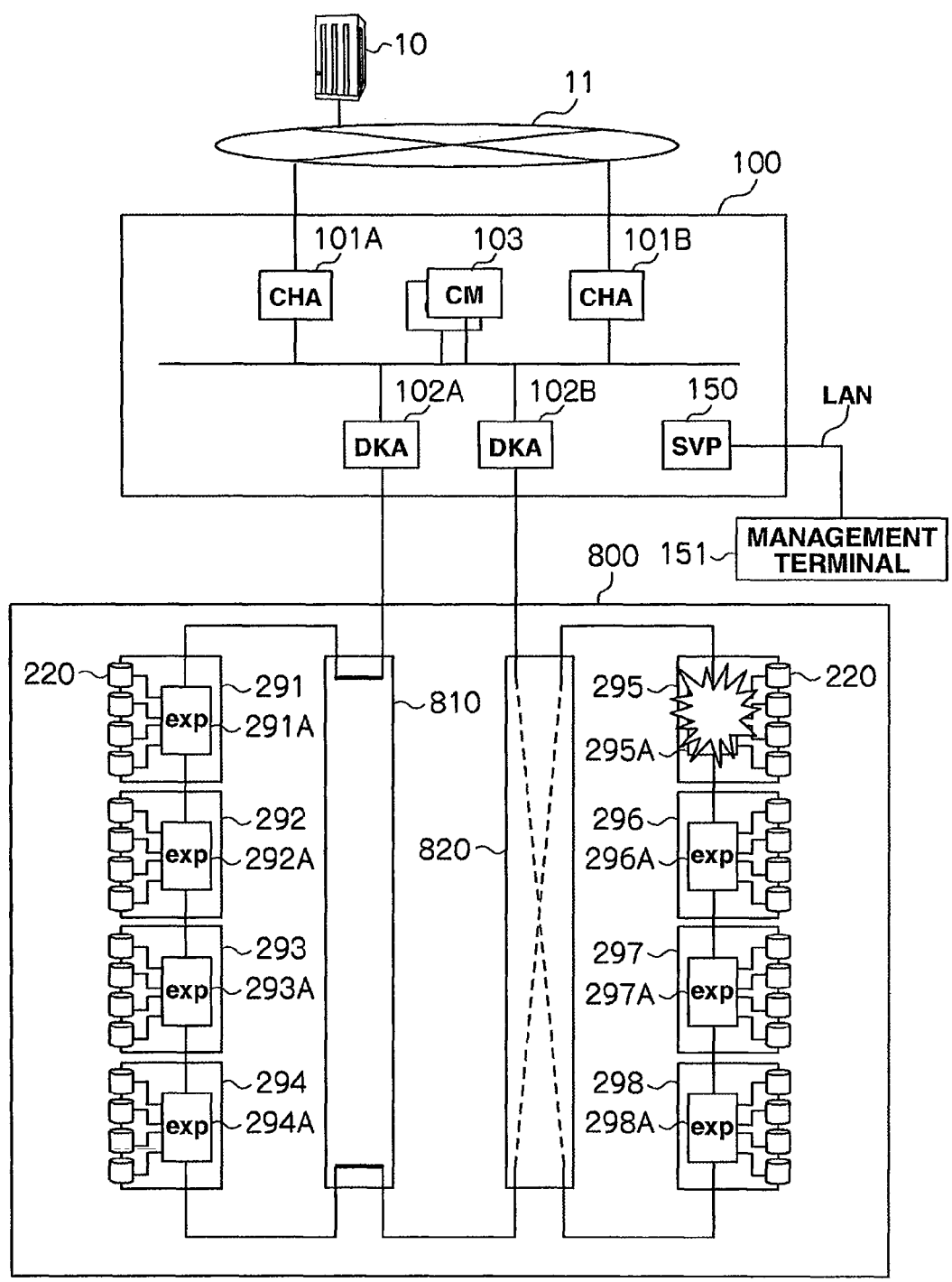
FIG. 23 is a diagram showing a part of a mode selection example of a disk-side channel selector according to the same embodiment.

FIG. 23 shows a case where a failure occurred in the expander 220. In this situation, M (A, A)=D (28, 0), M (A, B)=D (16, 12), M (B, A)=D (28, 0), M (B, B)=D (16, 12). Thus, M (A, B) or M (B, B) is selected.

Figure 24:
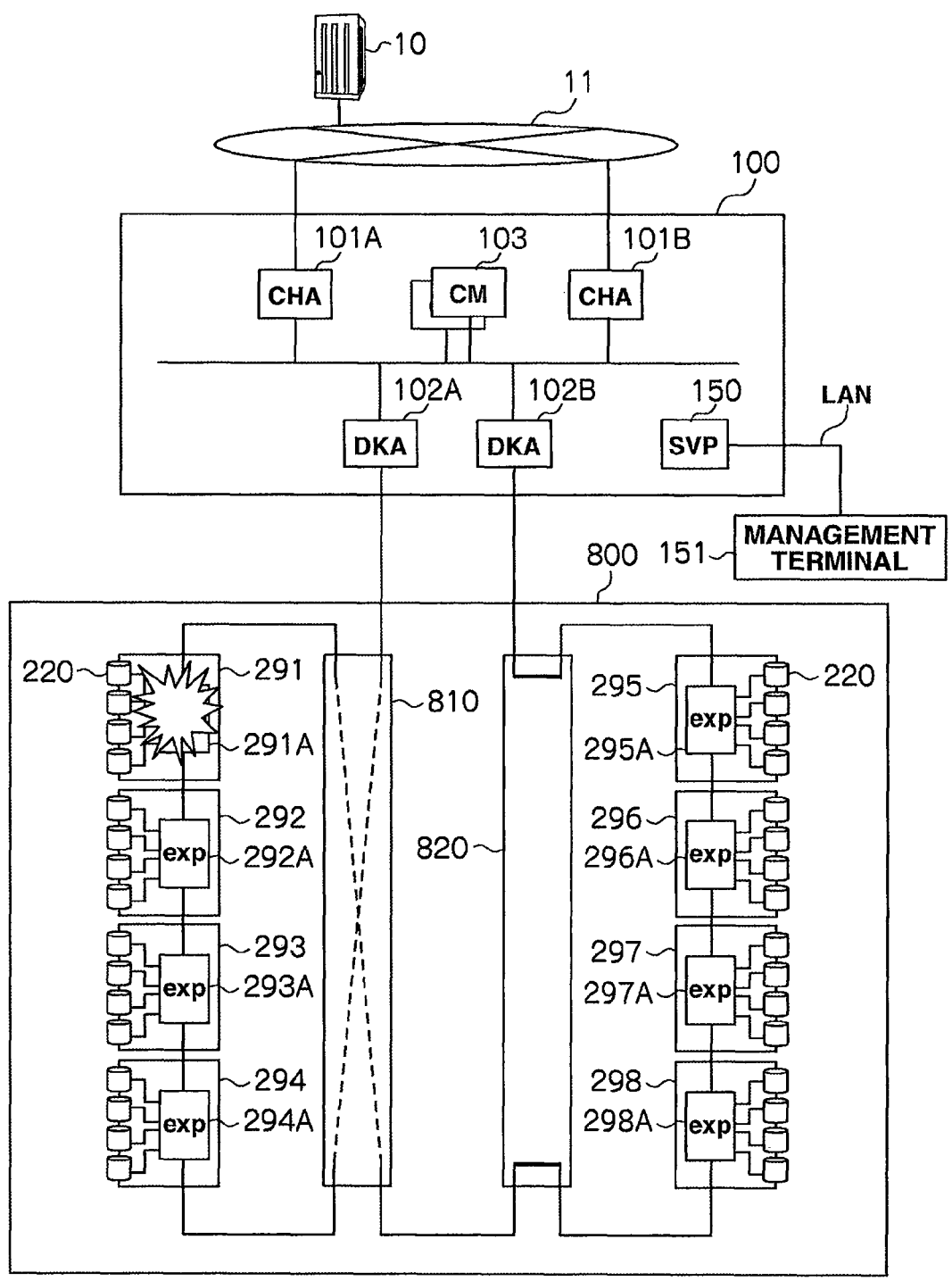
FIG. 24 is a diagram showing a part of a mode selection example of a disk-side channel selector according to the same embodiment.

FIG. 24 shows a case where a failure occurred in the expander 220. In this situation, M (A, A)=D (0, 28)), M (A, B)=D (0, 28), M (B, A)=D (12, 6), M (B, B)=D (12, 16). Thus, M (B, A) or M (B, B) is selected.

The third embodiment is also able to yield the similar effects as the first embodiment described above.

Other Embodiments

In the foregoing first embodiment, although the present invention was explained as the storage system 1 including a plurality of expanders 201A to 206A, 211A to 216A to be connected to a plurality of HDDs 220, a plurality of cascades (expanders 201A to 206A and expanders 211A to 216A) respectively connected to a prescribed number of expanders among the plurality of expanders 201A to 206A, 211A to 216A, and DKAs 102A, B for respectively controlling the plurality of cascades, further comprising an inter-cascade link 230 configured by connecting the expanders 206A, 216A of an end that is different from the side to be connected to the DKAs 102A, B of the plurality of cascades, wherein the DKAs 102A, B respectively manage the inter-cascade link 230 in a logically connected state or a logically disconnected state, the present invention is not limited to the foregoing configuration.

In addition, although the foregoing third embodiment was explained as a storage system 3 comprising a plurality of expanders 291A to 294A, 295A to 298A to be connected to a plurality of HDDs 220, and a plurality of cascades (expanders 291A to 294A, 295A to 298A) to be respectively connected to a prescribed number of expanders among the plurality of expanders 291A to 294A, 295A to 298A, further comprising a disk-side channel selector 810 to be arranged between the expanders 291A, 294A of one end of the plurality of cascades, and a disk-side channel selector 820 to be arranged between the expanders 295A, 298A, wherein the DKAs 102A, B respectively manage the connection status using the disk-side channel-selectors 810, 820 in two modes, the present invention is not limited to the foregoing configuration.

Although the foregoing embodiments explained a storage system that used an HDD as the storage medium, the present invention can also be applied to a storage system that uses a flash memory as the storage medium.

The present invention can be broadly applied to storage systems and the management method of their storage mediums.

What is claimed is:
1. A storage system, comprising:
a plurality of expanders to be connected to a plurality of storage mediums;
a plurality of cascades connected respectively to a prescribed number of expanders among the plurality of expanders; and
a plurality of control units for respectively controlling the plurality of cascades;
the storage system further comprising: an inter-cascade link configured by connecting expanders at an end that is different from the side to be controlled to the control units of the plurality of cascades,
wherein each of the plurality of control units manages the inter-cascade link as a logically connected state or a logically disconnected state,
wherein each control unit comprises a detection unit for detecting abnormalities in access,
wherein, when the detection unit detects an abnormality in the access of expanders or between the respective expanders, the control unit sets the inter-cascade link to a logically connected state so that the control unit can access to the expanders or between the respective expanders in which abnormalities have been detected by the detection unit, and
wherein, upon detecting that the abnormality has been eliminated with the detection unit, the control unit sets the inter-cascade link to a logically disconnected state,
wherein data to be stored is stored redundantly in the plurality of storage mediums configured from the same redundant group,
wherein the same redundant group is stored in corresponding storage mediums each being positioned on opposite sides of a point of symmetry between one cascade and another cascade,
wherein, when the plurality of cascades are two cascades, the storage mediums in one of the cascades are each assigned an identifier of a redundant group and said identifiers of the one cascades are assigned in ascending order in relation to the number of expanders to be passed through from the control units upon accessing that storage medium; and
wherein the storage mediums in the other cascade among the plurality of cascades are each assigned an identifier of a redundant group and said identifiers of the one cascades are assigned in descending order in relation to the number of expanders to be passed through from the control units upon accessing that storage medium.

2. The storage system according to claim 1, wherein the protocol for connecting the control unit and the storage medium is a connection-oriented protocol.

3. The storage system according to claim 1, wherein the protocol for connecting the control unit and the expander is a Serial Attached SCSI (SAS) expander.

4. The storage system according to claim 1, wherein a control unit that is different from the control unit that detected the abnormality outputs a command for setting the inter-cascade link to a logically connected state.

5. The storage system according to claim 1, wherein the control unit, after setting the inter-cascade link to a logically connected state, logically disconnects the location connected to a detected abnormal location.

6. The storage system according to claim 1, wherein, upon detecting that the abnormality has been eliminated with the detection unit, the control unit sets the inter-cascade link to a logically disconnected state, and thereafter logically connects the location connected to the location where the abnormality had been eliminated.

7. The storage system according to claim 1, wherein the expanders are respectively connected in series.

8. A storage system, comprising:
a plurality of expanders to be connected to a plurality of storage mediums;
a plurality of cascades connected respectively to a prescribed number of expanders among the plurality of expanders; and
a plurality of control units for respectively controlling the plurality of cascades;
the storage system further comprising:
a plurality of selectors arranged between expanders at the end of the plurality of cascades,
wherein the plurality of selectors comprise:
a connection state that connects one port of the control unit and the port of one end of the cascade, and connects one port of a disk-side channel selector configuring a pair and the port of the other end of the cascade, and
a connection state that reverses the ends of the cascade to be connected to the control unit selector configuring a pair with the control unit,
wherein each the plurality of control units manages the connection status using the selector in two modes,
wherein data to be stored is stored redundantly in the plurality of storage mediums configured from the same redundant group,
wherein the same redundant group is stored in corresponding storage mediums each being positioned on opposite sides of a point of symmetry between one cascade and another cascade,
wherein, when the plurality of cascades are two cascades, the storage mediums in one of the cascades are each assigned an identifier of a redundant group and said identifiers of the one cascades are assigned in ascending order in relation to the number of expanders to be passed through from the control units upon accessing that storage medium; and
wherein the storage mediums in the other cascade among the plurality of cascades are each assigned an identifier of a redundant group and said identifiers of the one cascades are assigned in descending order in relation to the number of expanders to be passed through from the control units upon accessing that storage medium.

9. The storage system according to claim 8, wherein one of the two modes makes the control unit and one port of the cascade to be of a connection status, and makes the other selector and another port of the cascade to be of a connection status; and
wherein the other mode of the two modes makes the control unit and a port of the cascade that was switched with the other mode to be of a connection status, and makes the other selector and another port of the cascade that was switched with the connection mode to be of a connection status.

10. The storage system according to claim 8, wherein the two modes are set so that the difference in the number of storage mediums that are accessible from each of the control units becomes minimum.

11. The storage system according to claim 8, wherein the two modes are set so that the expected value of the storage mediums that will be inaccessible from each of the control units when any one of the expanders is disabled becomes minimum.

12. A storage medium management method of a storage system, comprising:
a plurality of expanders to be connected to a plurality of storage mediums;
a plurality of cascades connected respectively to a prescribed number of expanders among the plurality of expanders;
a plurality of control units for respectively controlling the plurality of cascades; and
an inter-cascade link configured by connecting expanders at an end that is different from a side to be controlled to the control units of the plurality of cascades,
wherein each of the plurality of control units manages the inter-cascade link as a logically connected state or a logically disconnected state,
wherein data to be stored is stored redundantly in the plurality of storage mediums configured from the same redundant group,
wherein the same redundant group is stored in corresponding storage mediums each being positioned on opposite sides of a point of symmetry between one cascade and another cascade,
wherein, when the plurality of cascades are two cascades, the storage mediums in one of the cascades are each assigned an identifier of a redundant group and said identifiers of the one cascades are assigned in ascending order in relation to the number of expanders to be passed through from the control units upon accessing that storage medium; and
wherein the storage mediums in the other cascade among the plurality of cascades are each assigned an identifier of a redundant group and said identifiers of the one cascades are assigned in descending order in relation to the number of expanders to be passed through from the control units upon accessing that storage medium.

13. A storage system according to claim 1, wherein the storage system further comprises:
a plurality of selectors arranged between expanders at the end of the plurality of cascades,
wherein the plurality of selectors comprise: a connection state that connects one port of the control unit and the port of one end of the cascade, and connects one port of a disk-side channel selector configuring a pair and the port of the other end of the cascade, and
a connection state that reverses the ends of the cascade to be connected to the control unit selector configuring a pair with the control unit,
wherein each the plurality of control units manages the connection status using the selector in two modes.

* * * * *